United States Patent [19]

Sturdevant, Jr.

[11] 4,431,864
[45] Feb. 14, 1984

[54] COMMUNICATIONS SYSTEM INPUT-OUTPUT CONVERTER

[75] Inventor: Norman J. Sturdevant, Jr., Lee, N.Y.

[73] Assignee: The United States of America as represented by the Secretary of the Air Force, Washington, D.C.

[21] Appl. No.: 311,471

[22] Filed: Oct. 14, 1981

[51] Int. Cl.³ .................. H04L 11/02; H04L 3/00
[52] U.S. Cl. .................................. 178/3; 178/17.5; 178/2 B
[58] Field of Search .............. 178/3, 17.5, 2 B, 1, 178/26 A; 370/41, 42, 43, 79; 364/200, 900

[56] References Cited

U.S. PATENT DOCUMENTS

| | | | |
|---|---|---|---|
| 2,979,564 | 4/1961 | Blodgett | 178/26 |
| 3,284,774 | 11/1966 | Leonard et al. | 340/172.5 |
| 3,936,600 | 2/1976 | Galbraith | 178/17.5 |
| 4,069,392 | 1/1978 | Goldenbert et al. | 178/58 R |

OTHER PUBLICATIONS

ASCII–Bandot Translator, J. Rowe, Electronics, Australia, vol. 38, No. 7, pp. 84,85,87,89,124,125, Oct. 1976.

Primary Examiner—Stafford D. Schreyer
Attorney, Agent, or Firm—Donald J. Singer; Willard R. Matthews

[57] ABSTRACT

An input-output converter permits the integration of terminals and transmit and receive equipments that operate at given logic voltage levels and character formats into communications system that operate at different logic voltage levels and character formats. The input-output converter includes a universal asynchronous receiver transmitter that converts m bit serial data into n bit parallel data in a receive mode and n bit parallel data to m bit serial data in a transmit mode while stripping and adding asynchronous start-stop bits. The input-output converter also includes logic voltage level converters that convert digital data to appropriate logic voltage levels for each function.

1 Claim, 34 Drawing Figures

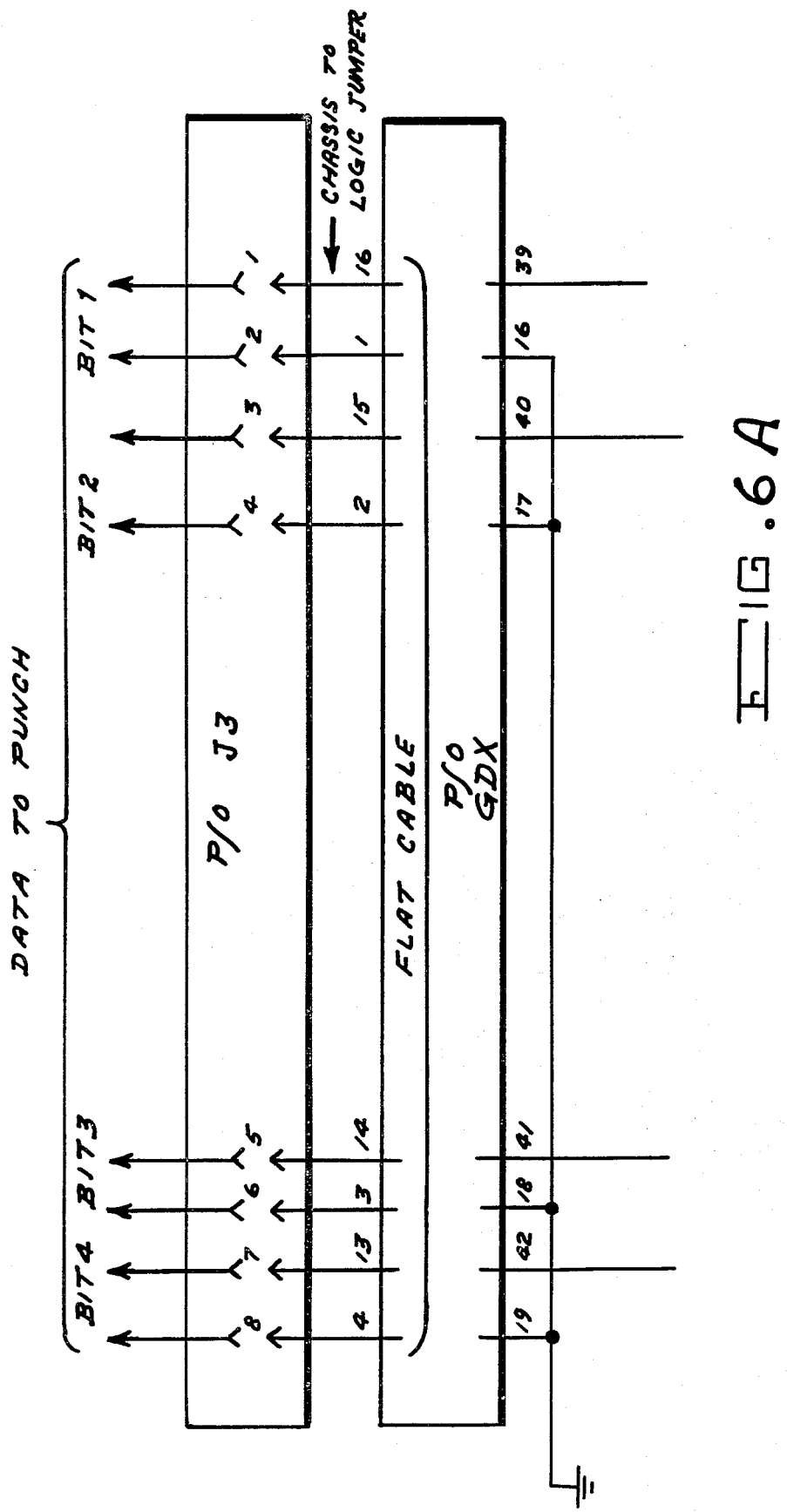

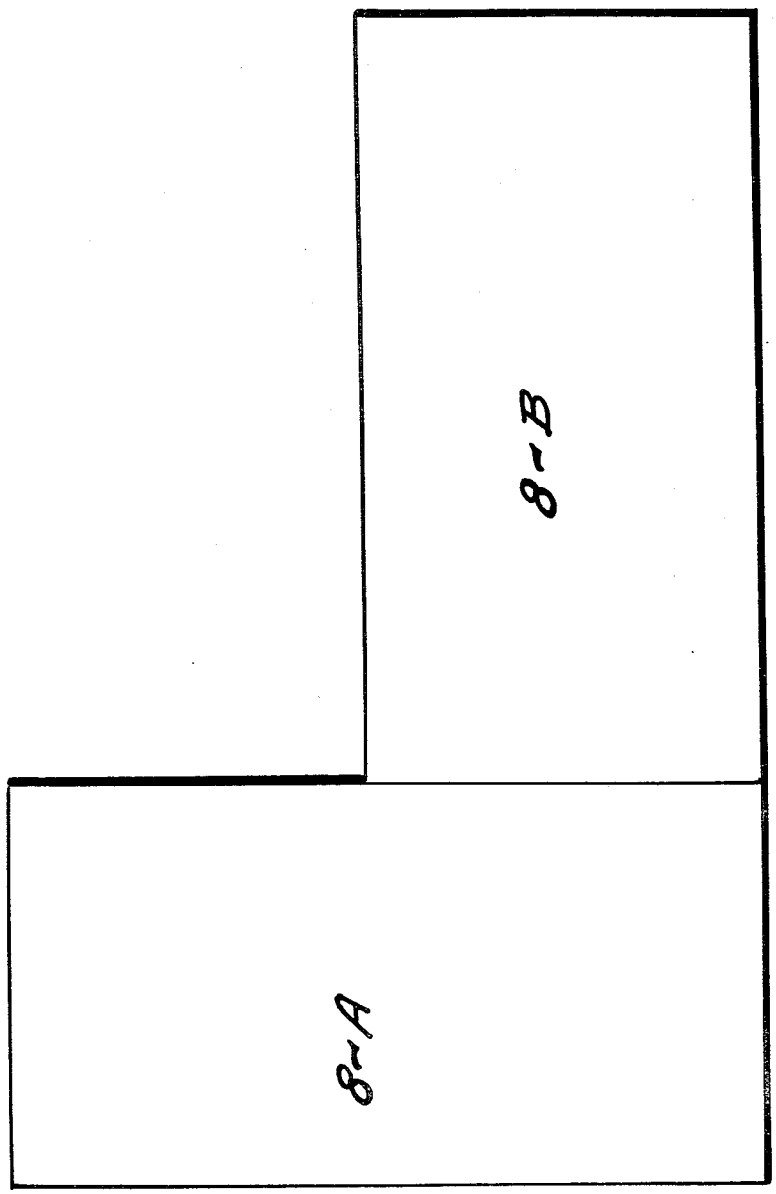

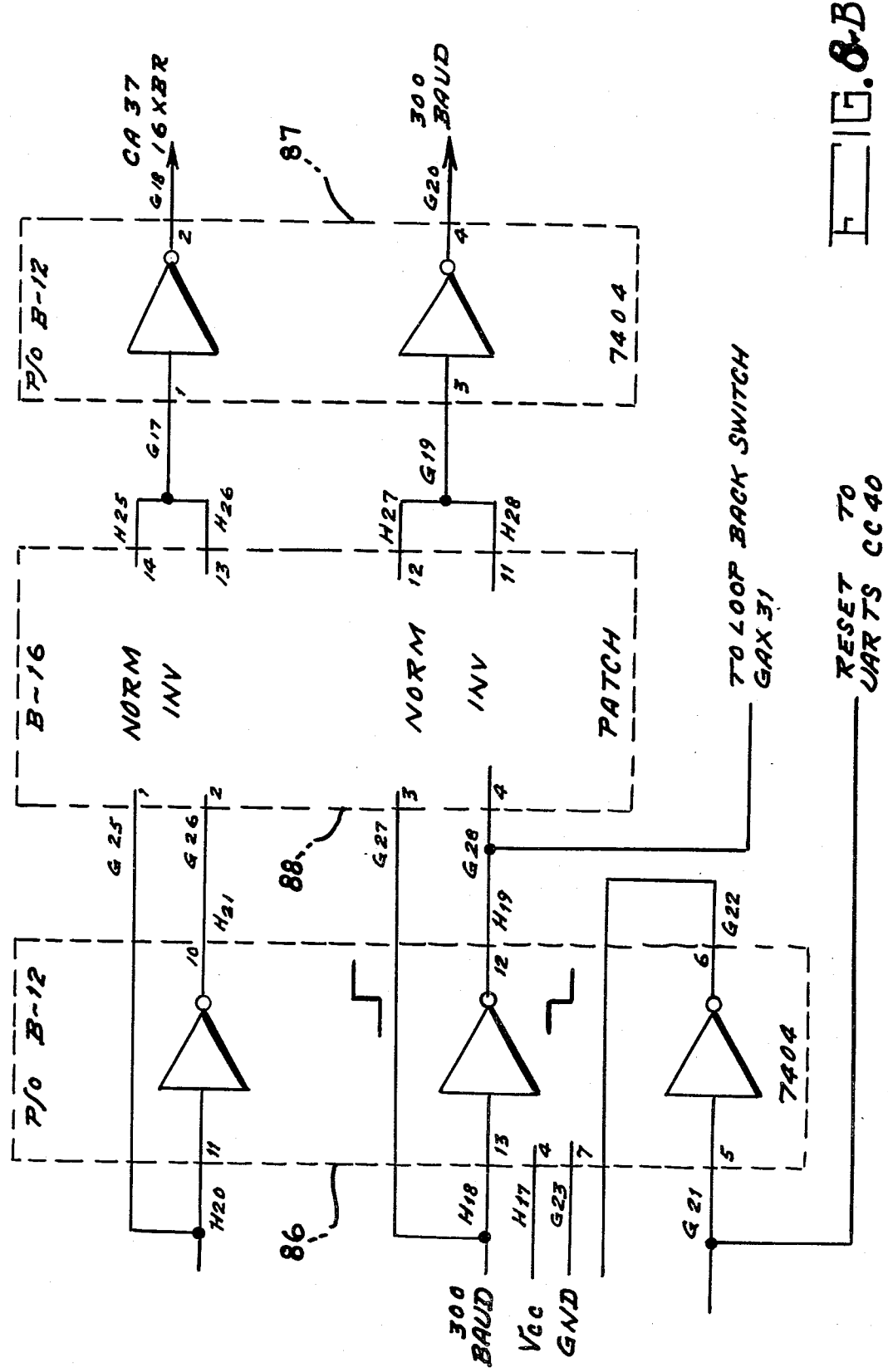

FIG. 10A
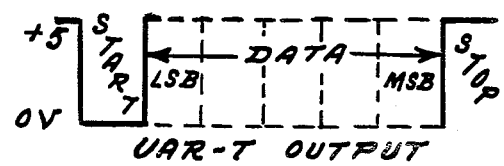
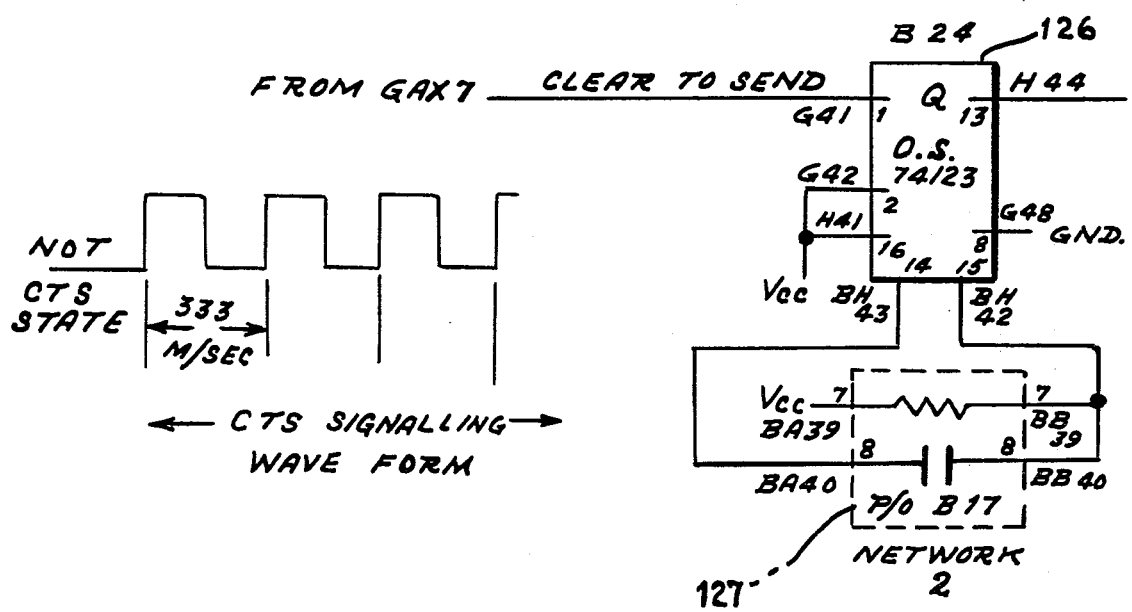

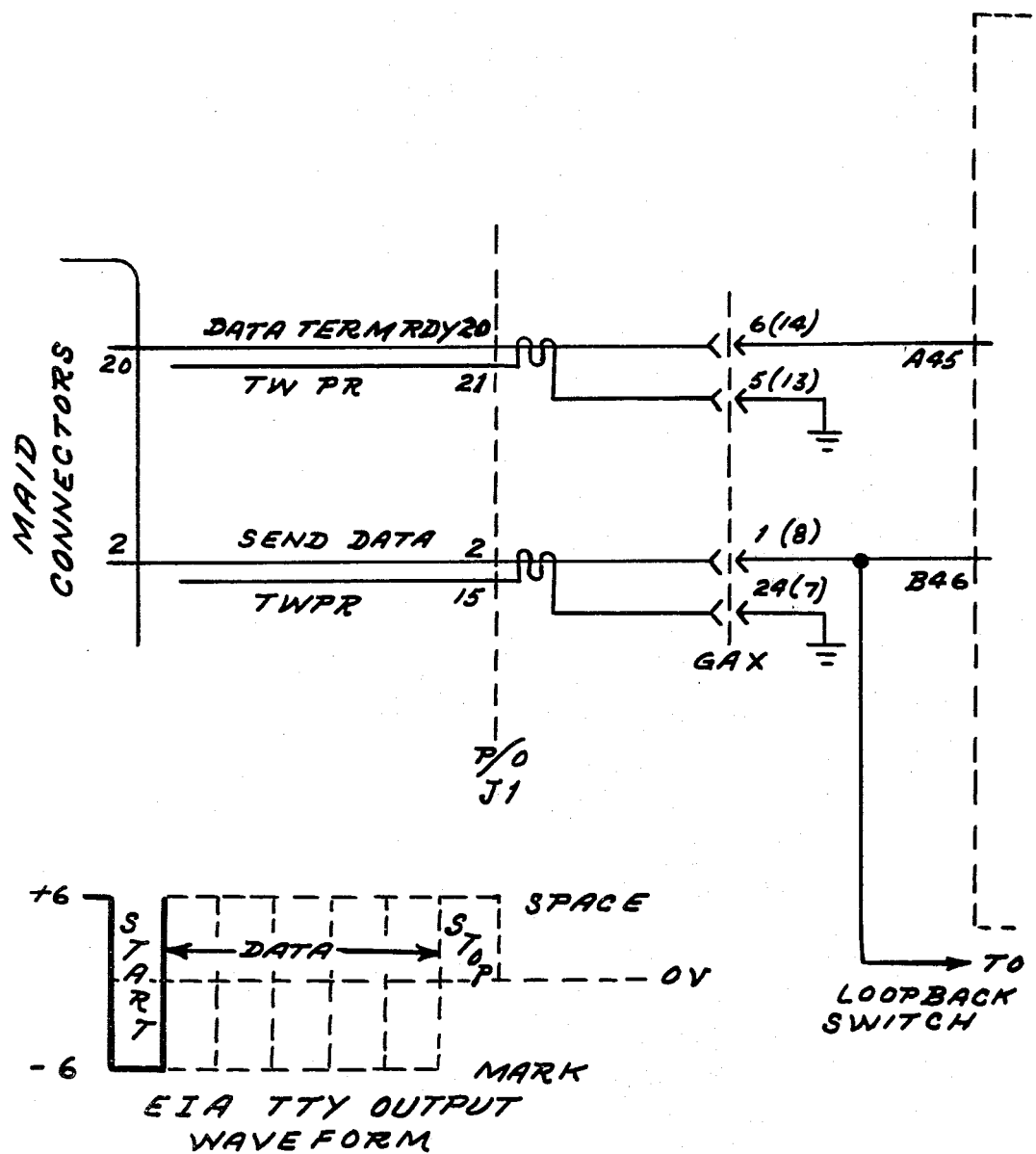

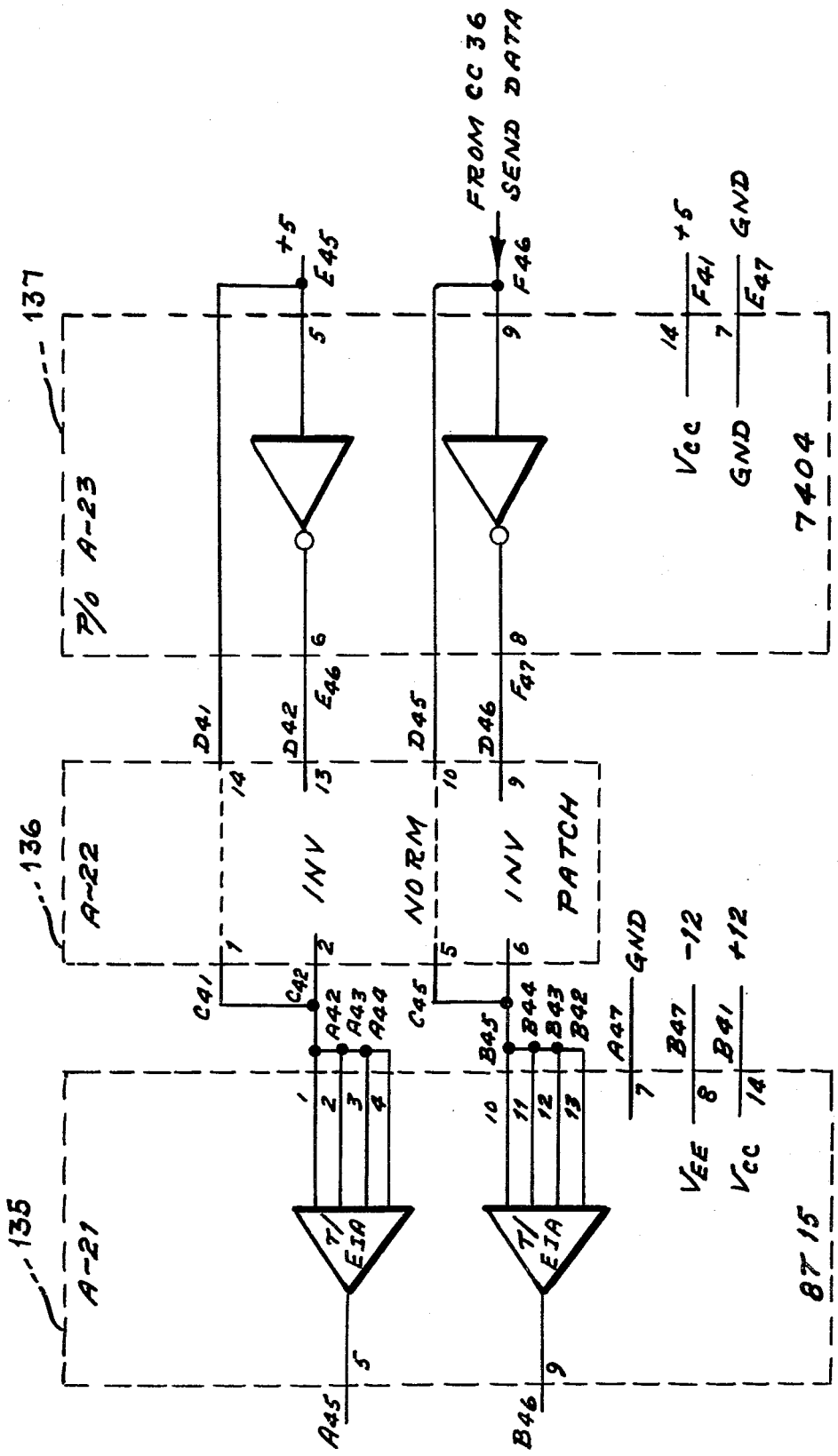

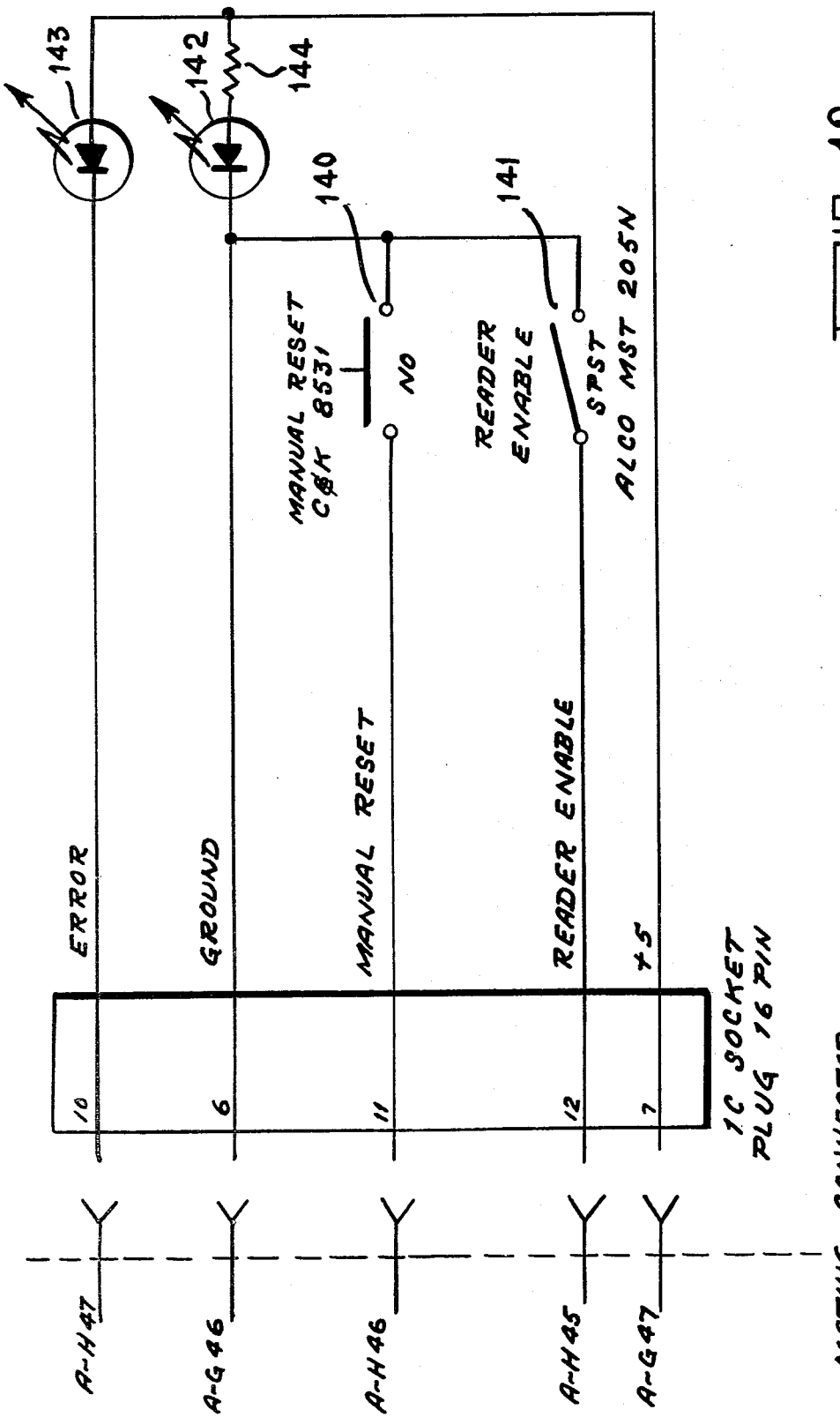

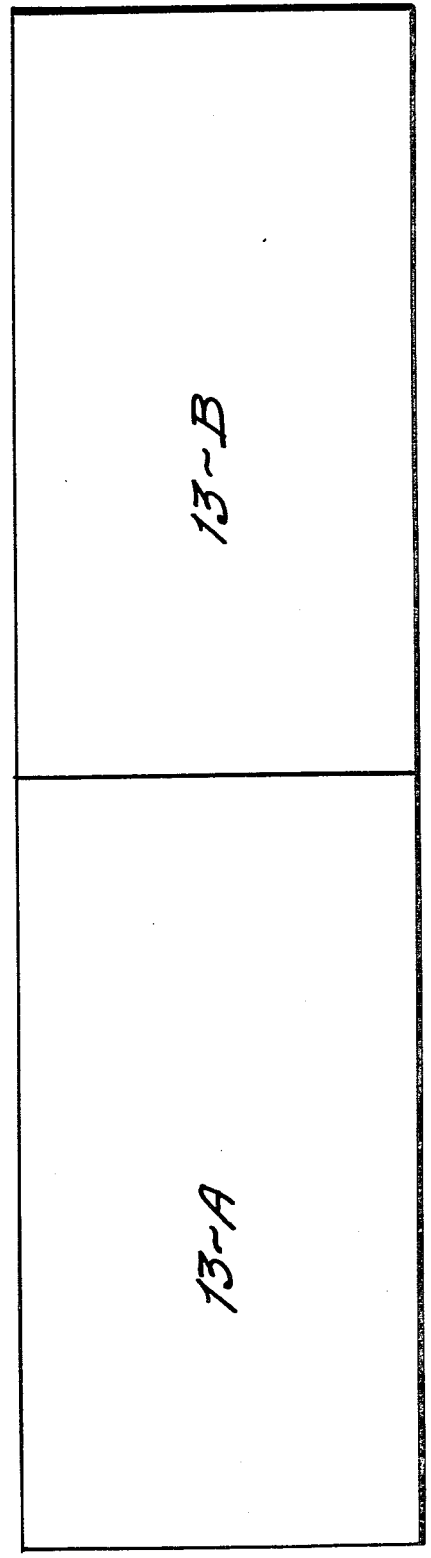

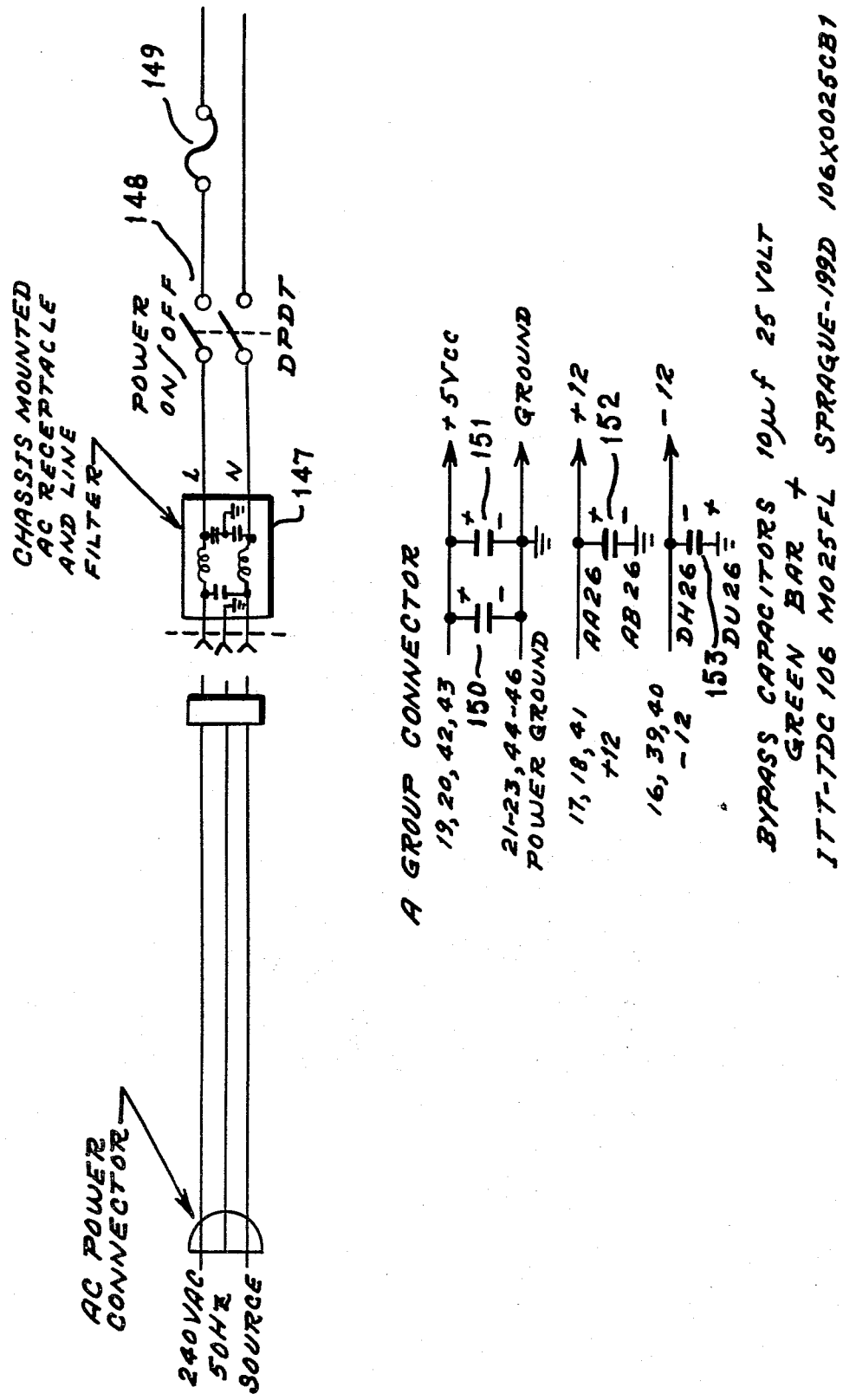

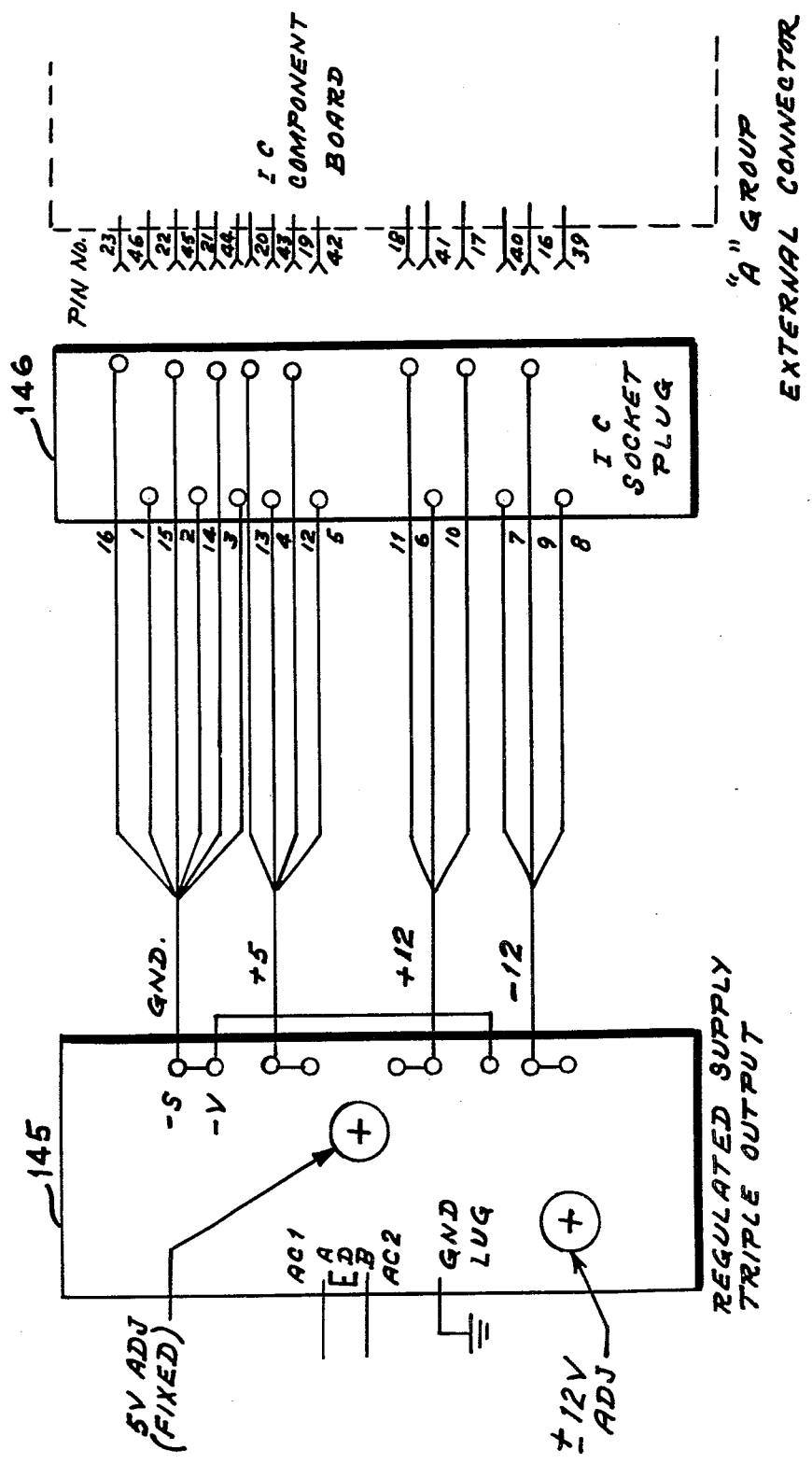

COMMUNICATIONS SYSTEM INPUT-OUTPUT CONVERTER

STATEMENT OF GOVERNMENT INTEREST

The invention described herein may be manufactured and used by or for the Government for governmental purposes without the payment of any royalty thereon.

BACKGROUND OF THE INVENTION

This invention relates to input-output converters and in particular to an interface for use in communications systems having terminals that utilized different logic voltage levels and character formats.

Communications systems that transmit and receive digital data are frequently integrated with terminals and transmitting and receiving equipment that function at different logic voltage levels and utilize different character formats. A typical example of such an arrangement is the Modular AUTODIN Interface Device (MAID) which operates into the local teletype terminal equipments at European NATO installations. The MAID UNIT supervises a coordinated operation with the European Automatic Digital Network (Autodin). The requirement in this particular instance is an input-output converter that accomplishes all the necessary logic voltage level and format conversions and generates the essential handshaking signal to permit the exchange of information between the MAID unit and three terminal units: a Transtel Model AH Printer, a Siemens Model 158 paper tape punch and a Siemons Model 38 Paper Tape Reader. Incoming 5 level serial asynchronous data with start-stop frame bits from the MAID must be converted to the correct logic level and polarity and forwarded to the printer for output. The asynchronous start-stop framing bits must then be removed from the five data bits and the character output in character parallel format to the paper tape punch with corresponding strobe signals. Character parallel data for outputting, which originates at the tape reader, must be sent to the converter for framing with the asynchronous start/stop bits and sent serially to the MAID at the correct logic voltage level. It is also required that the input-output converter respond to a "clear to send" command from this MAID for control of output information and provide a "ready" level to the MAID and an "enable" signal to the reader.

The present invention is directed toward providing an input-output converter that can accomplish all of these functions and that can be readily adapted to various other similar applications.

SUMMARY OF THE INVENTION

The input-output converter of the invention effects an interface between a communications system that operates at one given logic voltage level with a serial, asynchronous, 5 level digital data format and a digital message transmission and reception terminal that operates at a different logic voltage level with a parallel 5 bit data format. The input-output converter provides all logic voltage levels and format conversions necessary to permit exchange of information between the communications system and the message transmission and reception terminal. Data format conversion is provided by a universal asynchronous receiver transmitter. Its receiver function strips the asychronous start-stop bits from the serial 5 level data received from the communications system, converts the data to parallel format and transmits it to the message transmission and reception terminal. The transmitter function of the universal asynchronous receiver transmitter converts the parallel format data received from the digital message transmission and reception terminal to serial format, frames the 5 bit serial data with start-stop bits and transmits the data to the communications system. Various converter circuits connect the logic voltage levels utilized by the communications system and the message transmission and reception terminal to TTL levels for universal asynchronous receiver transmitter processing, and also convert the universal asynchronous receiver-transmitter outputs to correct logic voltage levels for use in the communications system and the message transmission and reception terminal. The input-output converter operates from a 300 baud clock and includes an error detector circuit for indicating the absence of correct logic voltage levels.

It is a principal object of the invention to provide a new and improved communications system input-output converter.

It is another object of the invention to provide an input-output converter that effectively interfaces a communications system operating with a given digital data format with a message transmission and reception terminal that operates with a different digital data format.

It is another object of the invention to provide an input-output converter that effectively interfaces a communications system that operates at one given logic voltage level with a message transmission and reception terminal that operates at a different logic voltage level.

It is another object of the invention to provide an input-output converter that provides all logic voltage levels and digital data format conversions necessary to permit exchange of information between a communications system that operates with a given data format and at a given logic voltage level and message transmission and reception terminal that operates with a different data format and at different logic voltage levels.

These, together with other objects features and advantages of the invention will become more readily apparent from the following detailed description taken in conjunction with the illustrative embodiment in the accompanying drawings.

DESCRIPTION OF THE DRAWINGS

FIG. 12 is a diagram of the front panel display and control of the I/O converter of FIG. 2; and FIG. 13, being comprised of FIGS. 13a and 13b is a schematic diagram of the power supply for the I/O converter of FIG. 2.

DETAILED DESCRIPTION OF THE PREFERRED EMBODIMENT

Figure 1:
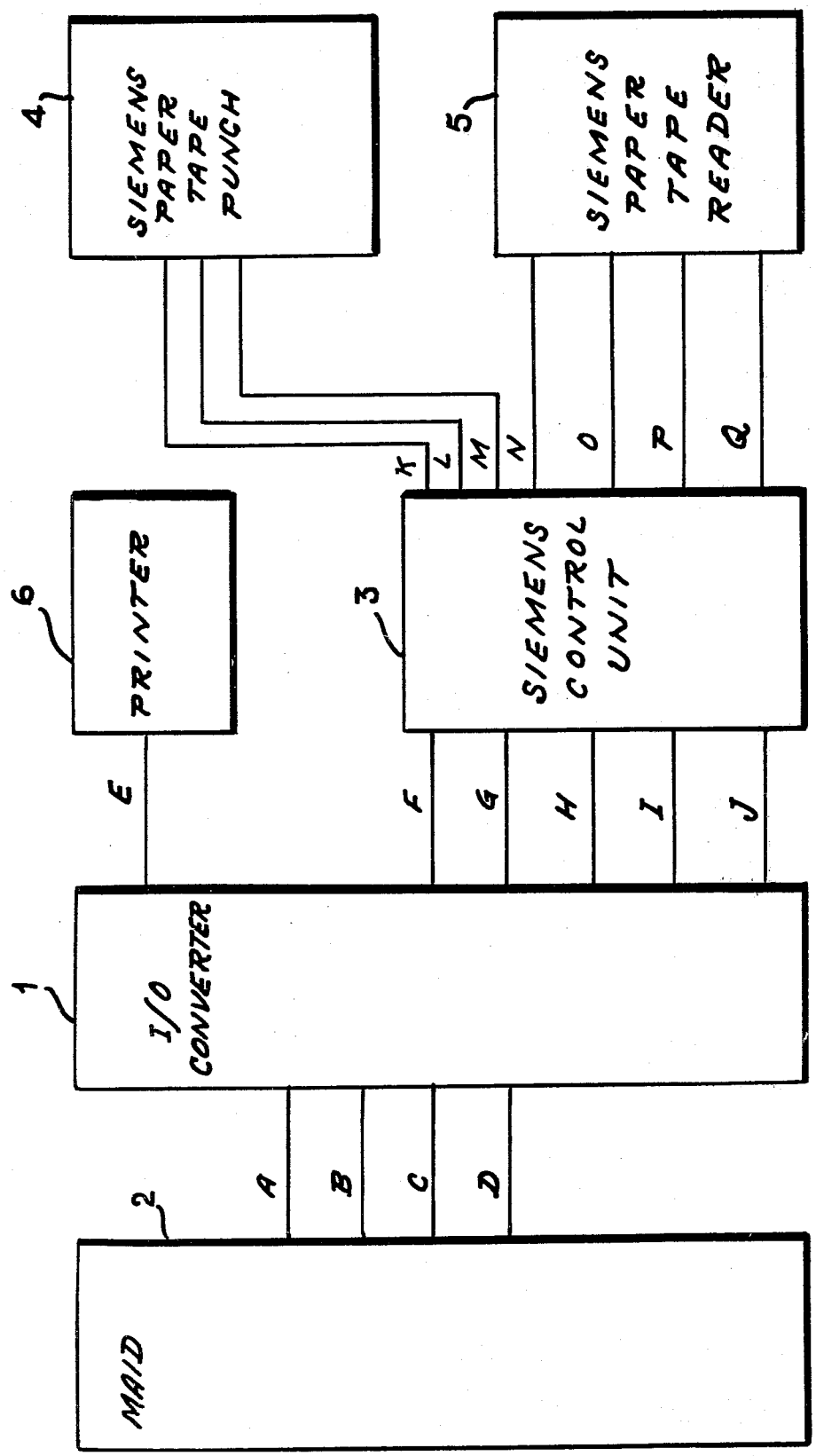
FIG. 1 is a block diagram of I/O converter of the invention and the communications system and terminal equipment with which it is integrated.

The invention is an input-output (I/O) converter for utilization in a communications system in which various data processing equipment operating with different character formats and at different logic voltage levels and used. It is hereinafter described in terms of a particular application; that of an interface between the interface device for the United States communications system used at NATO stations and the Siemens data terminal equipment associated therewith. The invention, however, is not limited to the application given and may be universally applied to all communications systems requiring the interface capability provided by the I/O converter described herein. The I/O Converter of the invention is hereinafter described in terms of its specific application as a means to provide the necessary electrical interface between the Modular AUTODIN Interface Device (MAID) and the Siemens Data Terminal Equipment (DTE) at NATO installations. The MAID provides for the AUTODIN interface to the United States Defense Communication System Automatic Digital Network (AUTODIN). It is a full duplex device capable of simultaneous digital transmission and reception of messages. The MAID generates the transmissions Identification (TI) line for each message sent to AUTODIN. The MAID provides for all AUTODIN requirements including lineblock framing, response to control sequences, and the generation of control sequences as needed for proper AUTODIN Mode I operation. The Siemens DTE provides for a full duplex digital, message transmission and reception terminal. A Transtel printer is also provided for page copy of received messages. The DTE also includes a Siemens Data interface 38, a Siemens paper tape punch 158, a Siemens Paper Tabe Reader 28 and a Transtel printer model AH.

The Siemens Data Interface 38, also referred to as the Control Unit, is responsible for the parallel bit transfer of messages orginated by the reader, or for the punch. It is also responsible for the activation of certain equipment functions within the reader and punch.

The Siemens Paper Tape Punch 158 provides for a paper tape output of received messages using a 5 level data code.

The Siemens Paper Tape Reader 38 provides for the input of paper tape messages for transmission using a 5 level data code.

The Transtel Printer receives and provides a copy of all messages received. It uses a 5 level data code input and is capable of receiving up to 40 characters per second. The I/O Converter of the invention permits the MAID to operate with the DTE. It must provide for various interfaces by proper conversion of input and output digital data. These interfaces include messages to be transmitted to AUTODIN which are generated as a parallel five bit data stream by the Siemens Paper Tape Reader 38. The I/O Converter sends this bit stream to the MAID as serial five bit data with appropriate start and stop bits for asynchronous operation. Messages received from AUTODIN through the MAID are in a serial five bit data stress with appropriate start and stop bits for asynchronous operation. The I/O Converter sends this bit stream to the Siemens Paper Tape Punch 158 as parallel five bit data. The serial five bit data with start and stop bits is also provided to the Transtel Printer. The I/0 Converter must also provide for the proper low to high level interface between the MAID and DTE. The MAID is a low level plus and minus 6 volt DC device. All the DTE equipment is high level and requires from 20 to 40 milliamps of current for proper operation on all data and control interface circuits. The I/O Converter has been designed to operate with a MAID operating at a 300 baud data rate with AUTODIN. The I/0 Converter has also been designed to operate asynchronously with the MAID using start and stop bits.

The I/O Converter of the invention is also provided with various Controls and Indicators. These include a power on/off switch, a power indicator, a reset, an error indicator and a reader enable.

The power On/Off Switch is provided on the rear of the device chassis. When power is on a green power indicator located on the front panel will be on. The power indicator is a green indicator light located on the front panel of the device is on when the power is applied. The preset is a push button switch and is depressed when it is necessary to reset the I/O Converter to an initial power on state. Error indicator is achieved by a red indicator light located on the front pannel is on if the MAID has sent incorrectly formated receiver data to the I/O Converter. The reader enable is a toggle switch located on the front panel of the device and must be in the on position for the reader to function properly.

FIG. 1 is a block diagram of the interface between the I/O Converter of the invention and the MAID/DTE. Referring thereto I/O converter 1 representing the invention is shown interconnected by various lines designated A-Q to the MAID 2 and the data terminal equipment consisting of Siemen control unit 3, Siemen paper tape punch 4, Siemen paper tape reader 5, and printer 6. The following Table I indicates the functions and logic voltage levels of each of the connecting lines A-Q.

TABLE I

| Line | Function | Logic voltage level |
|---|---|---|
| A | send data | serial 5 level, ± 6V |
| B | receive data | serial 5 level, ± 6V |
| C | data terminal ready | +6V terminal ready 6V terminal not ready |
| D | clear to send | 6V pulses at 300 bits/sec CTS −6V not clear to send |
| E | receive data | serial 5 level 0 to −12V |
| F | receive data | parallel 5 bits 0 to −12V |
| G | data available | −12V |
| H | reader enable | ground when reader enable open when reader disabled |
| I | request | 0 to −12V pulses |
| J | send data | parallel 5 bits 0 to −12V |
| K | data available | 0 to −12V pulses |
| L | received data | Parallel 5 bits |
| M | enable or | |
| N | data available | 0 to −12V pulses |

TABLE I-continued

| Line | Function | Logic voltage level |
|---|---|---|
| P | request | 0 to −12V pulses |
| Q | send data | parallel 5 bits 0 to −12V |

Figure 2:
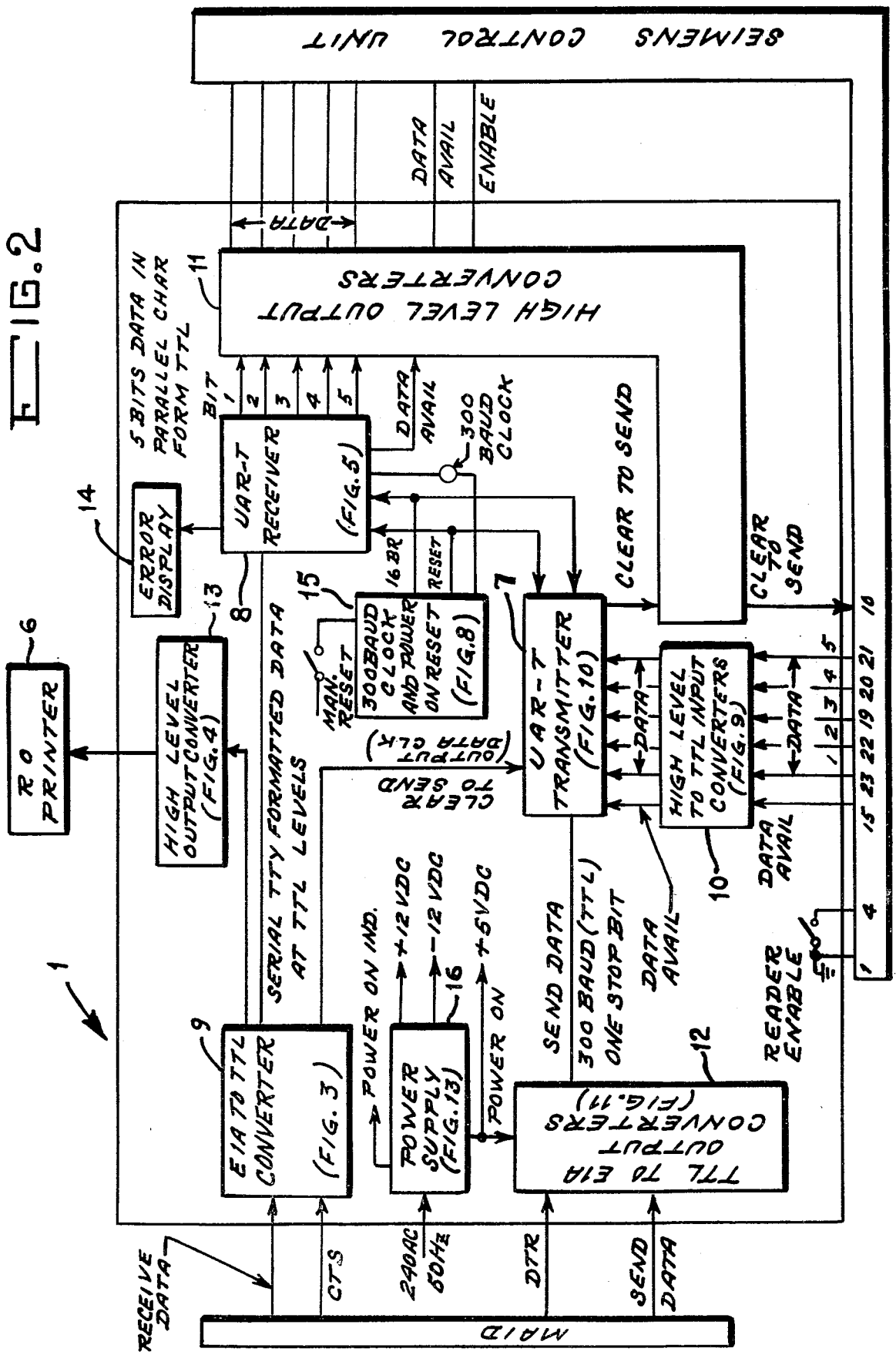
FIG. 2 is a functional block diagram of the I/O converter of the invention.

FIG. 2 is a functional block diagram of the I/O converter of the invention. The I/O converter illustrated therein comprises a universal asynchronous receiver transmitter (UAR-T) shown functionally as UAR-T transmitter 7 and UAR-T receiver 8, EIA to TTL converters 9, high level to TTL input converter 10, high level output converters 11, TTL to EIA output converters 12, high level output converters 13, error display 14, 300 baud clock 15 and power supply 16.

In the broadest terms, the I/O Converter can be separated into two major areas: a transmit area and a receive area.

The transmit area is associated with the paper tape reader 5 and is responsible for coordinating the transfer of information in the form of five bit characters from the paper tape to the MAID unit at a seven bit teletype, formatted character in a serial bit-by-bit format at 300 baud. Essentially, the MAID unit can be viewed as always ready for data to be transmitted to the AUTO-DIN. This is signalled by a Clear to Send (CTS) clock at 300 Hz. At the Converter, the clock is transformed from EIA levels (+ or − 6 V centered on zero baseline) to a standard TTL level (0 to +5 VDC) and then forwarded to the UAR-T transmitter 7. At the UAR-T transmitter 7, this signal is shaped and then "ANDed" with a level from the UAR-T itself which signifies that the transmit buffer is empty (TBMT) and able to accept a new character. The composite signal (still called Clear to Send) is then converted to a high level logic signal by converter 11 logic and output to the reader. This signal, together with the Reader Enable signal, as controlled by a front panel switch on the I/0 Converter, causes the paper tape reader to position the next five bit character under the read station and generate a Data Available pulse. All five bits of data and the Data Available pulse are then sent to the I/0 Converter where they pass through High Level to TTL level input converters 10. Within the UAR-T logic the Data Available pulse is delayed to allow the data lines to stabilize and then shaped into a 2.5 microsecond pulse to be used to strobe the data into the UAR-T transmit section. Within the UAR-T this strobe causes two actions: the Transmit Buffer Empty level is dropped and serial transmission of the five bit character properly framed with a Start and Stop bit commences. At the end of the character transmission, the Transmit Buffer Empty level is again raised to signal the ability to accept a new character for serialization. If the 300 Hz Clear to Send clock is still present from the MAID and the Reader Enable switch is still on, the process of reading a character and outputting serially continues. One of three actions will cause this process to cease: (1) the 300 Hz Clear to Send signal from the MAID drops to a continuous −6 V level signifying the MAID's output buffer is full and it cannot accept further data, (2) the Reader Enable switch is set to the non-operate position or (3) the paper reader is not ready.

The EIA to TTL Converter section 9 of the I/O Converter is responsible for passing information received from the MAID to the printer 6 and punch unit 4 at the proper levels and format. The information received from the MAID is serial 300 baud TTY formatted information at standard + or − 6 V EIA logic levels. The printer unit 6 utilizes the same format. However, the logic levels must be converted to high level 0 to −12 VDC. This is accomplished by first converting the + or − 6 V logic to 0 to +5 V TTL levels and then to 0 to −12 VDC by the circuitry of high level output converter 13.

The information sent to the punch requires conversion to a five bit paralled character format. For this operation the UAR-T is employed. It strips off the framing bits and presents the five data bits to the five high level output circuits associated with each bit. When the receive section 8 of the UAR-T has completed assembling each five bit character, it generates a Data Avaliable signal. This signal eventually is changed into a pulse which causes the data character to be stored and punched on the paper tape punch unit 4. Supporting both in the receive and transmit sections 7, 8 is the 300 baud clock and power-on reset 15. A crystal controlled bit rate generator chip is strapped to generate a symmetrical square wave clock at 4.8 KHz which is 16 times the baud rate of 300. The 4.8 KHz clock is divided by a four stage counter to generate the 300 baud clock used for transmission. The power-on reset insures that the error indication and UAR-TS are reset to the correct state.

The error circuitry of error display 14 is associated with the receiver only and when lit indicates the correct logic level was not found during stop bit processing by the UAR-T. Generally, this will indicate a faulty transfer of information in circuitry between the MAID and the UAR-T receiver sections.

Figure 3:
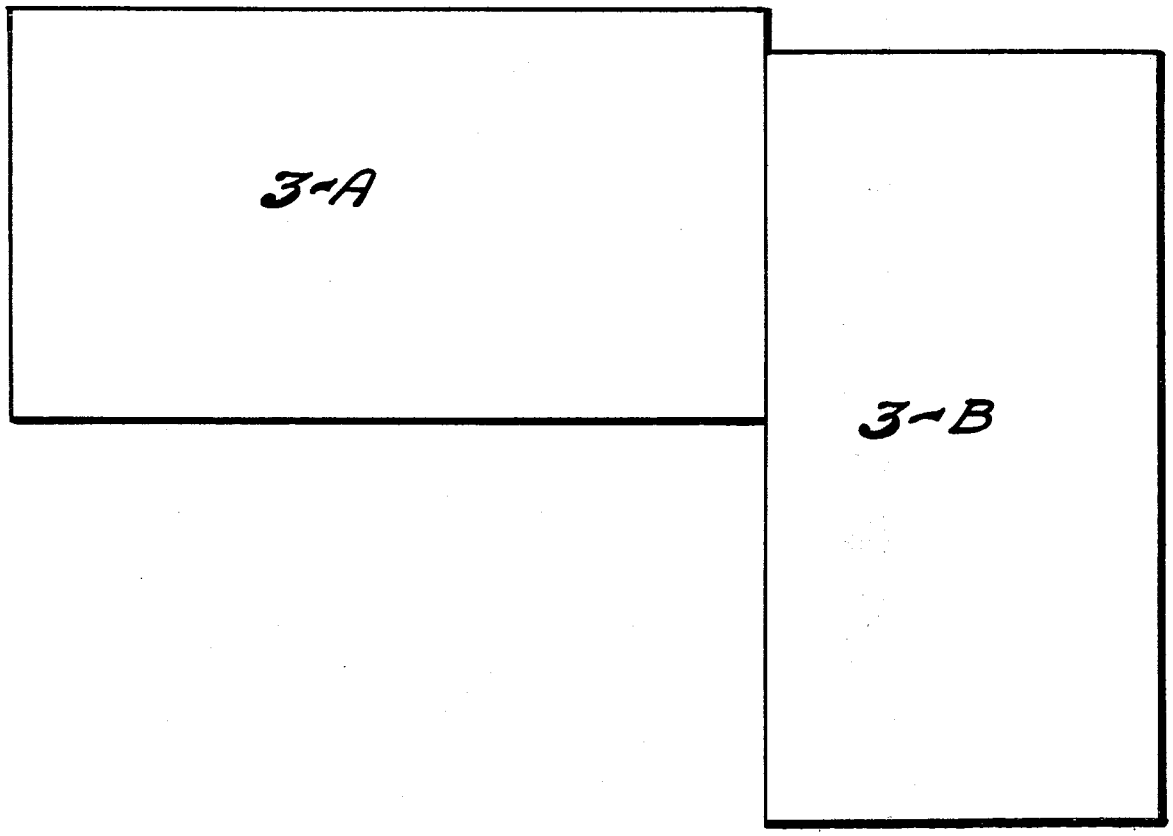
FIG. 3 being comprised of FIGS. 3a and 3b is a schematic diagram of the EIA to TTL converter circuit of the I/O converter of FIG. 2.
Figure 3A:
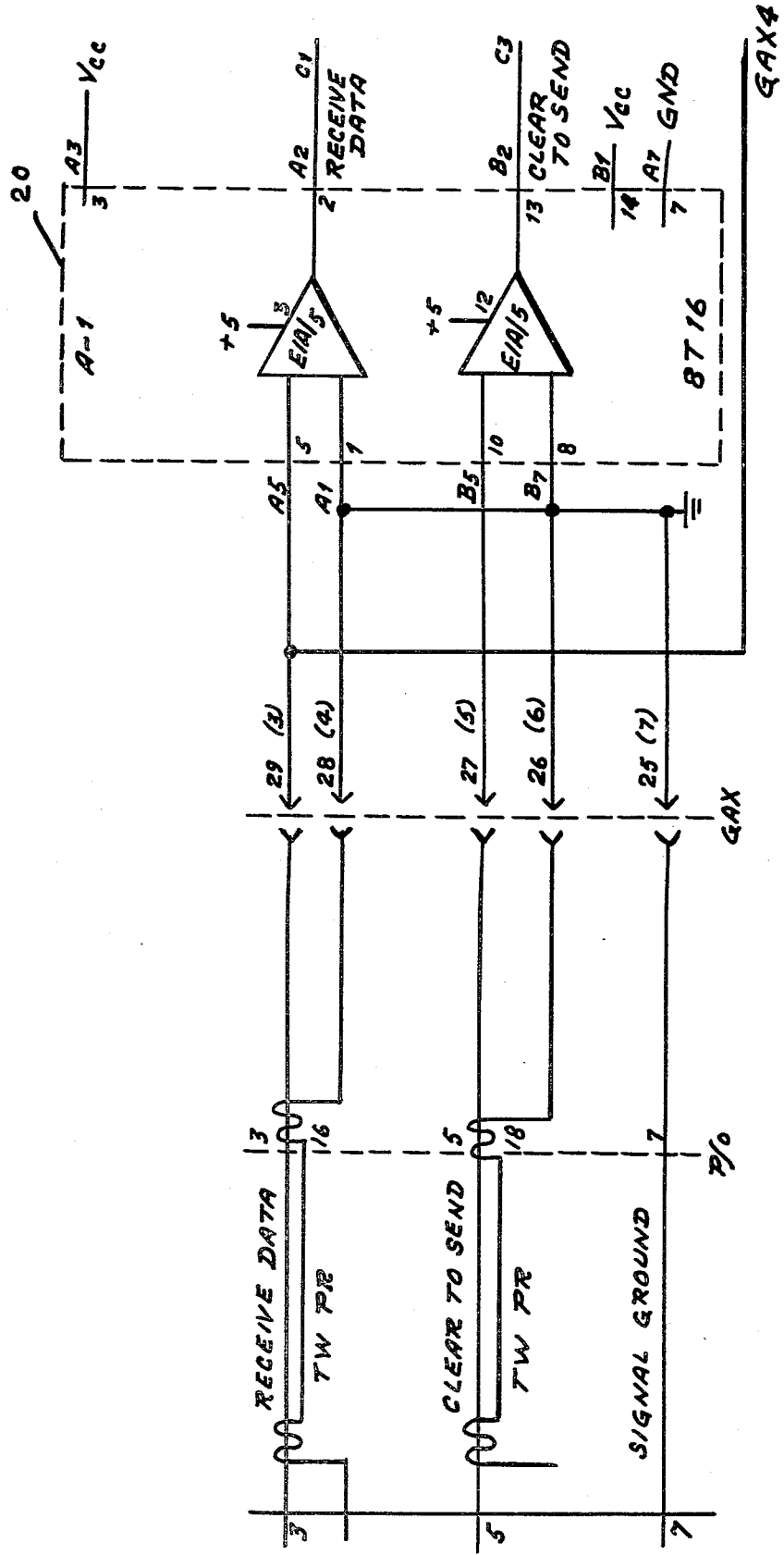
Figure 3B:
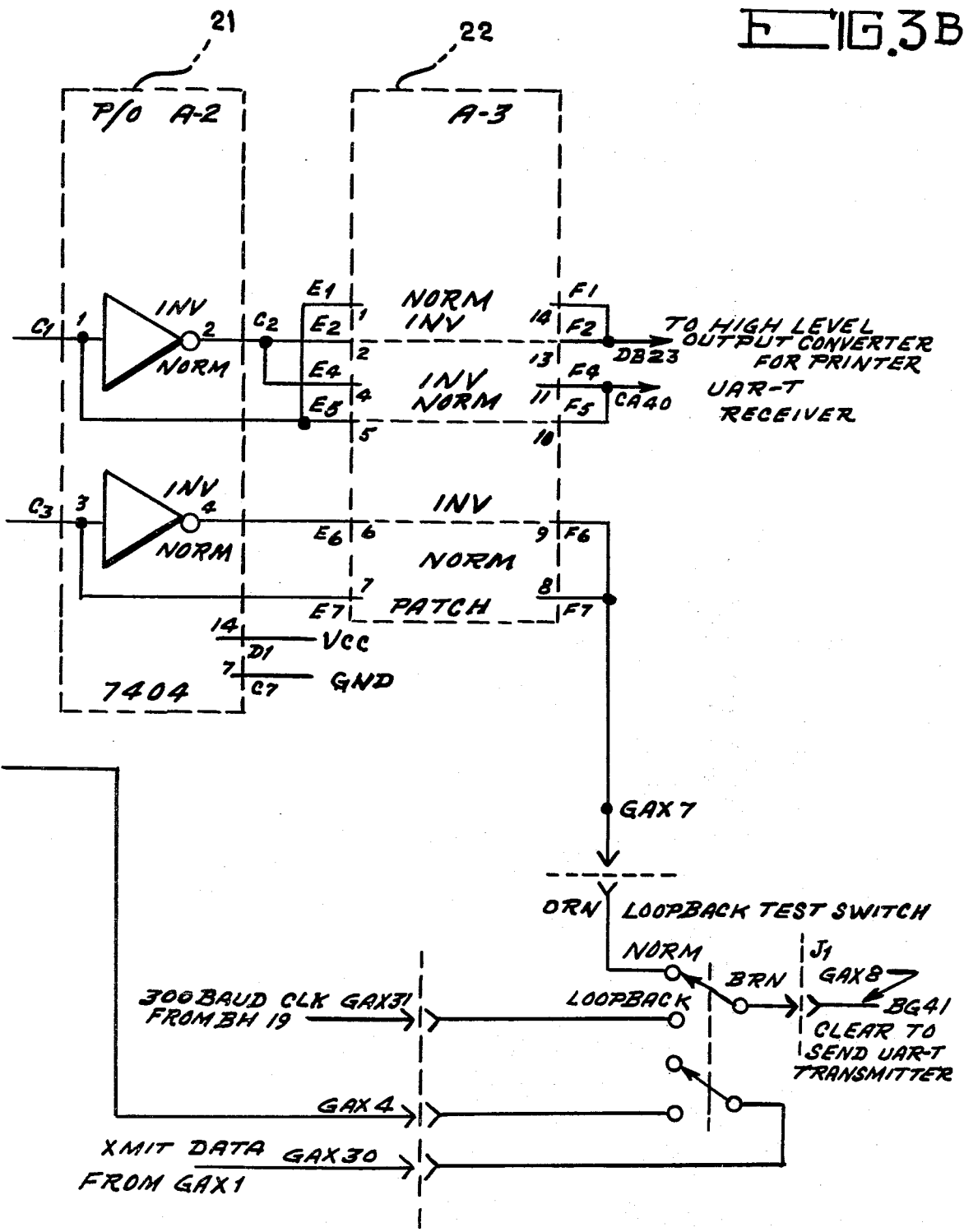

Referring now to FIGS. 3, 3a and 3b, there is shown thereby a schematic diagram of the EIA to TTL input converter 9. The principal components of the circuit are dual communication EIA/MIL line receiver 20, inverter circuit 21 and patch circuit 22. There are two inputs to the I/0 Converter from the MAID: Receive Data and Clear to Send. The signals are standard EIA logic levels of + and − 6 V and must be converted to standard TTL 0 to +5 V for internal use by the Converter. This function is performed by a Dual Communications EIA/MIL Line Receiver 20 (8T16).

The Receive Data waveform is a teletype (TTY) formatted seven bit character: five data bits bracketed by a Start and Stop pulse. This same waveform at 0 to +5 V and an inverted form appear at the strapping area A3. The placement of a strap at E1 or E2 results in selection of the appropriate polarity for the printer for the Receive Data output to the UAR-T receiver at strap location E4 and E5.

The Clear to Send signal from the MAID sits at a −6 V level when the MAID cannot accept additional data. Normally a 300 Hz square wave clock at + and − 6 V centered on a 0 volt baseline is present at the input signifying the MAID can accept data. The 8T16 at A1, inverter at A2 and strapping option at A3 provide for conversion of the input signal to a standard TTL level and selection of the proper polarity to the UAR-T transmitter area. The output from the strapping area is passed through the Loopback switch. For loopback operation the internal 300 baud clock is substituted for the MAID Clear to Send signal. The transmit data is connected directly to input of receive data during loopback operation. Use of the Loopback switch allows self testing of the I/O Converter with the Siemens equipment without the MAID unit.

Figure 4:
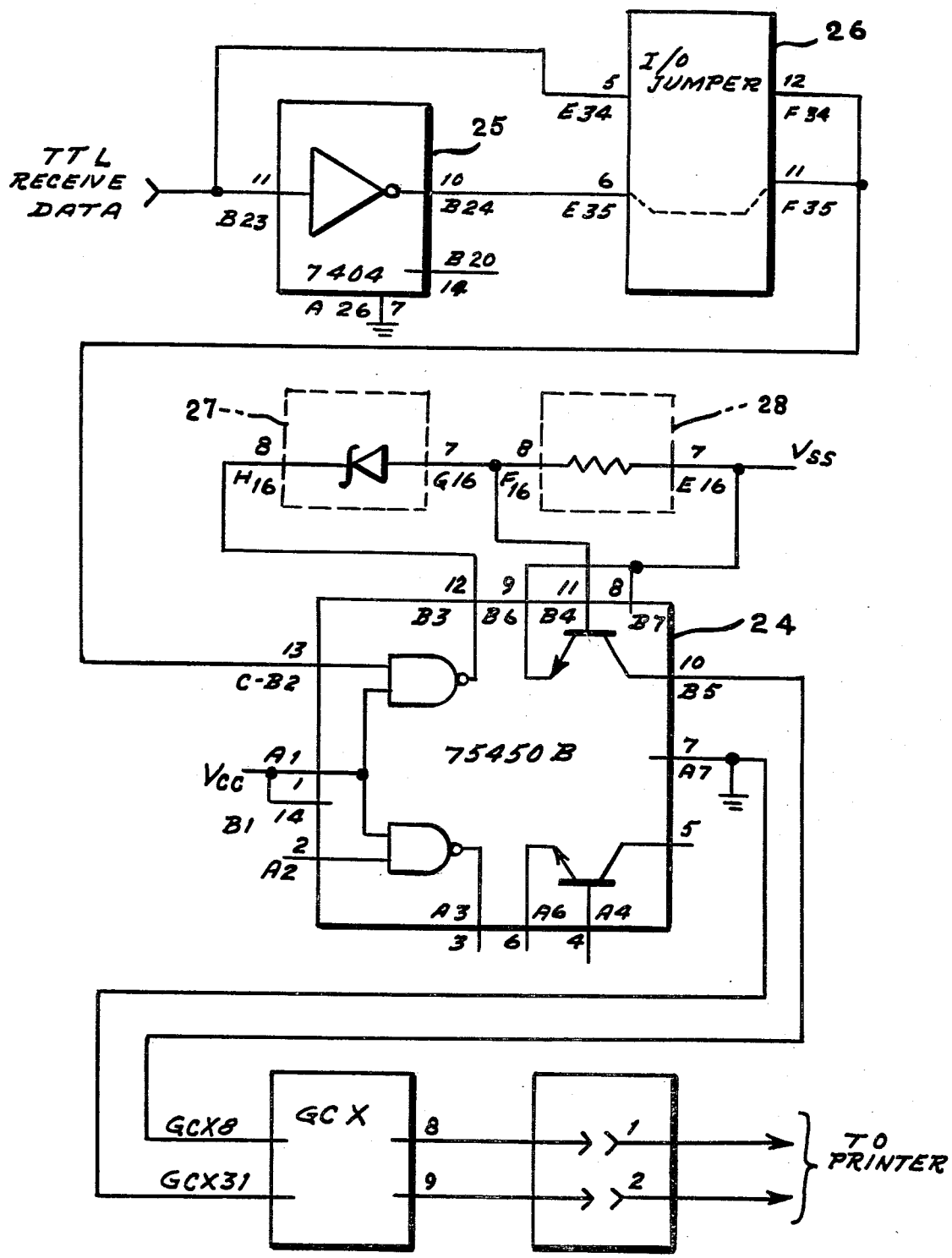
FIG. 4 is a schematic diagram of the high level output converter of FIG. 2.

The high Level Output Converter 13 of FIG. 2 is shown schematically in FIG. 4. It comprises intergrated circuits 24 (75 450B), inverter 25, patch circuit 26, zero diode 27 and resistor 28. The TTY formated data received from the MAID is converted to TTL levels by EIA TO TTL converter 9. In FIG. 4 the high level converter for the printer is shown in detail. This converter is necessary to convert the TTL level to a 0 to −12 V level for use by the printer logic. The input signal is inverted and forwarded to the patch circuit 26 by inverter 25. The redundant inverters 1 and 25 plus the unused lower section of the 75450B circuit 24, shown in FIG. 4 provide the capability of interfacing a second printer or a CRT terminal.

The 75450B integrated circuit 24 is a peripheral device driver which, in this application, functions as a one-input AND gate with a discrete transistor output. The Zener diode 27 and the resistor 28 establish the correct biasing for the transistor such that it operates between saturation and cutoff, thus switching the output between 0 volts and −12 V (Vss). At the printer end a −12 V applied to the input results in current flow through an optical isolator which, in turn, is interpreted as a logic ONE level.

Figure 5:
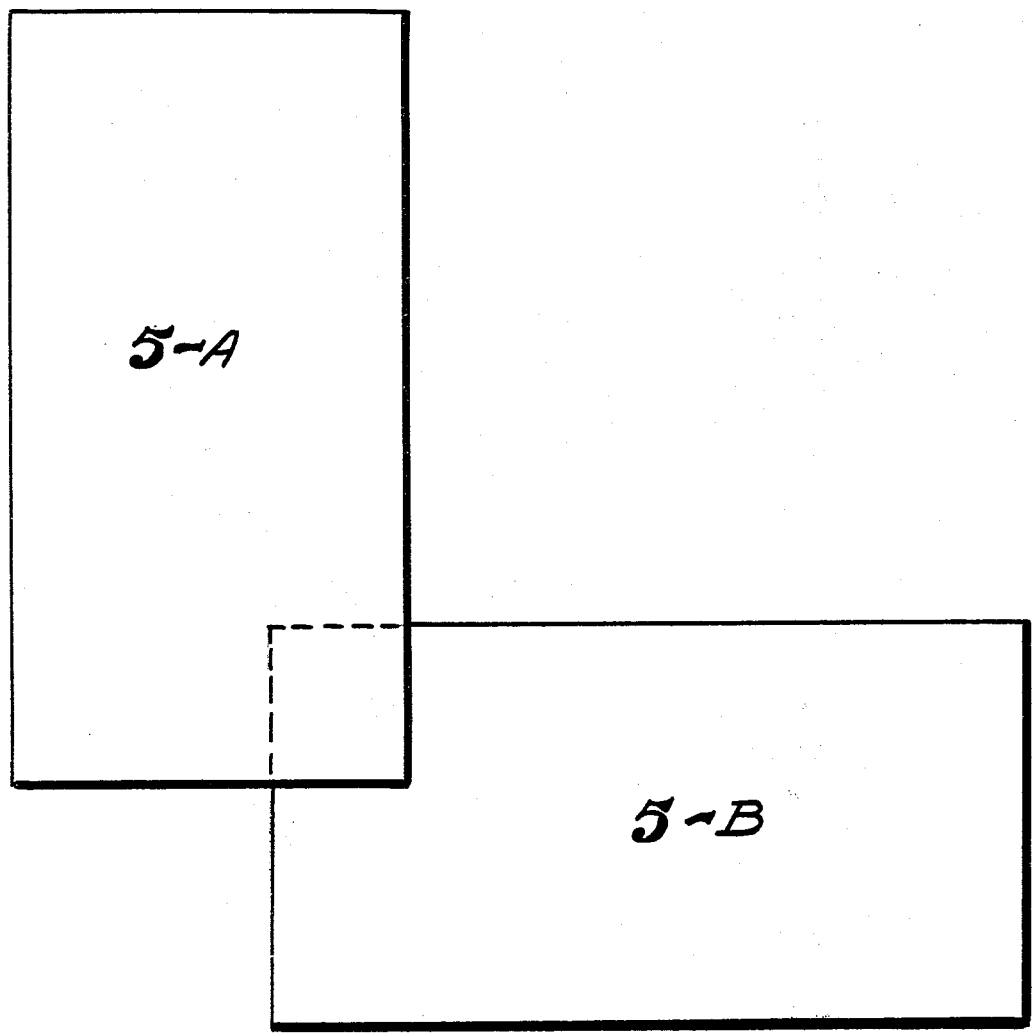
FIG. 5, being comprised of FIGS. 5a and 5b is a schematic diagram of the UAR-T receiver function of the I/O converter of FIG. 2.
Figure 5A:
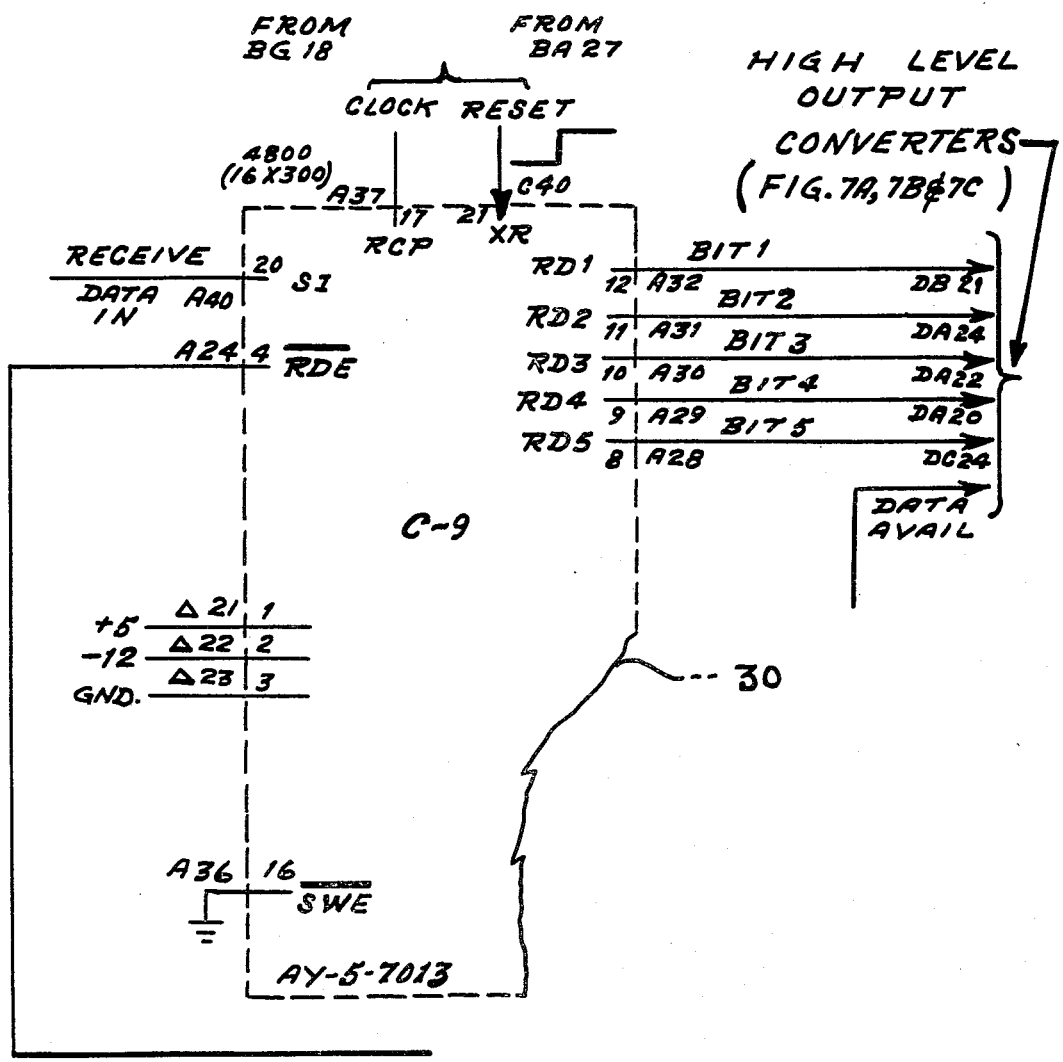
Figure 5B:
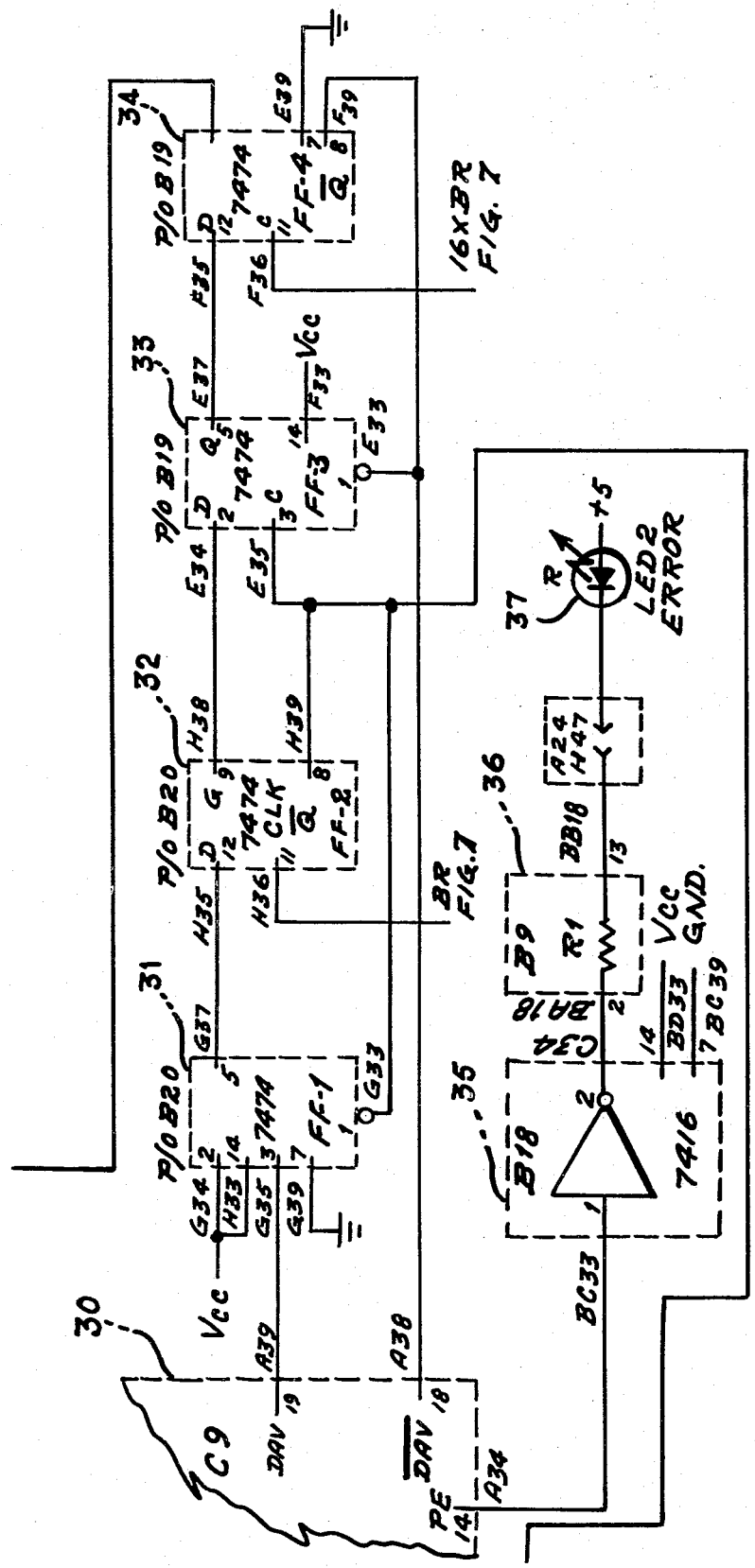

FIG. 5, 5a and 5b show the portion of the UAR-T associated with the receiver function Since the UAR-T is a programmable processor which has various modes of operation, only those functions pertinent to this I/O converter of the invention are discussed.

The Universal Asynchronous Receiver/Transmitter (UAR/T) is an LSI subsystem which accepts binary characters from either a terminal device or a computer and receives/transmits the character with appended control and error detecting bits. All characters contain a start bit: 5 to 8 data bits, one or two stop bits (1½ stop bit capability with the AY-3-1014A/1015), and either odd/even parity or no parity. In order to make the UAR/T universal, the baud, bits per word, parity mode, and the number of stop bits are externally selectable. The device is constructed on a single monolithic chip. All inputs and outputs are directly compatible with MTOS/MTNS logic, and also with TTL/DTL/CMOS logic without the need for interfacing components. All strobed outputs are three-stable logic.

Referring to FIGS. 5a and 5b it is seen that the receiver function is effected by means of the circuit comprising P-channel nitride process IC chip 30, flip flops 31-34, inverter 35, resistor 36 and LED 37.

Receive data in TTY format appears at the serial input (SI, A40) pin of the UAR-T receiver section.

Within the UAR-T, the levels appearing at this input are sampled using the 16 times baud rate clock (RCP). Eight consecutive samples of this input level during which the input appears at the marking state (0 volts) is interpreted as a valid Start bit. At this time the UAR-T resets its divide by 16 counter for the input 16×baud rate clock. By doing this, the UAR-T knows that the center of the next date bit will appear 16 counts later.

The voltage (logic) level present at the sample time, which is the center of each bit period, is accepted as the data bit state for each of the next five data bit periods and the Stop bit period. Each of the five data bits is shifted into an input register and right justified such that the least significant (LSB) will always appear at RDI output pin of the UAR-T regardless of the number of data bits in the input character. (The UAR-T is capable of handling a 12 bit character; one Start bit, 8 data bits, a parity bit and two Stop bits.)

After the entire character has been read in, the Stop bit is checked for correct logic state. An incorrect Stop bit state results in an error condition which will appear as an error indication on the front panel of the Converter. This indicator should be interpreted to be a problem with the UAR-T or the data path between the MAID output and the Serial Data input to the UAR-T.

Figure 6:
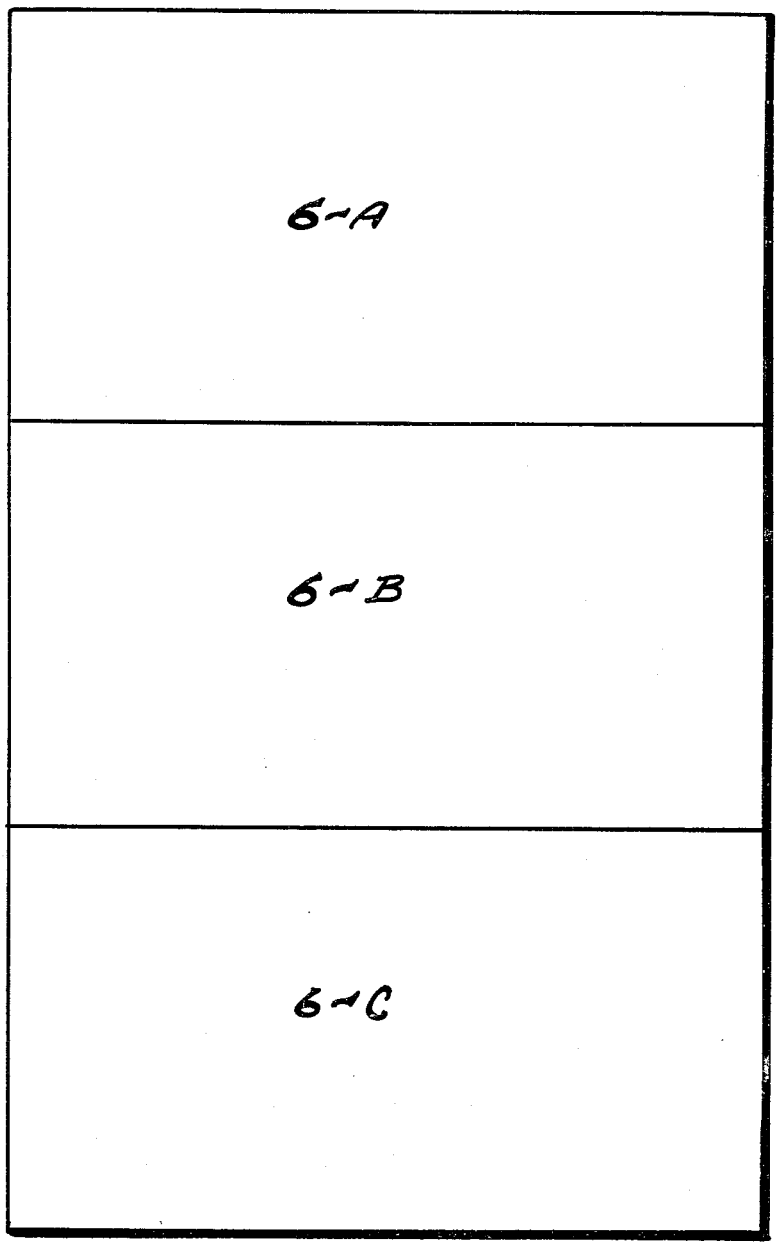
FIG. 6, being comprised of FIGS. 6a, 6b and 6c.

Independent of the Stop bit check (valid or not), the five information bits are transferred from the receive shift register to the receiver holding register buffer. At the end of a full character a control signal, Data Available, is generated. As shown in FIG. 6 the Data Available (DAV) signal and other status word information is only available at an output pin when the status word Enable input is at the correct (true) state. For this reason, input pin 16, SWE (A36) is held at a ground level continually for this application. Referring not to FIG. 5 logic, it can be seen that the DAV signal is used at the clock input to a D type flip-flop (FF-1). With the D input G34 held to +5 (Vcc) FF-1 sets when the clock input (DAV) transitions from a zero level to a one level. The 0 side output of FF-2 is connected directly to the D input of PP-2. With the next positive transition of the baud rate clock FF-2 is set. As the result of FF-2 being set, two very important steps occur. First, FF-1 is forced to the reset state. Secondly, the Q output is used to condition RDE input to the UAR-T on pin A24. This signal, which is the Received Data Enable, places the received data on the parallel output lines to be sent to the paper tape punch. With FF-1 now reset, FF-2 can now reset with the next positive transition of the baud rate clock. The transitioning of FF-2 from a set to a reset state results in the setting of FF-3. With FF-3 set, FF-4 sets at the next 16×BR interval (20B microsecond). During that period, the Q output clears FF-3 and resets the Data Available flip-flop within the UAR-T receiver. The delay created by FF-3 and FF-4 allows the output lines to stabilize before the information is strobed into punch circuitry registers.

Figure 6B:
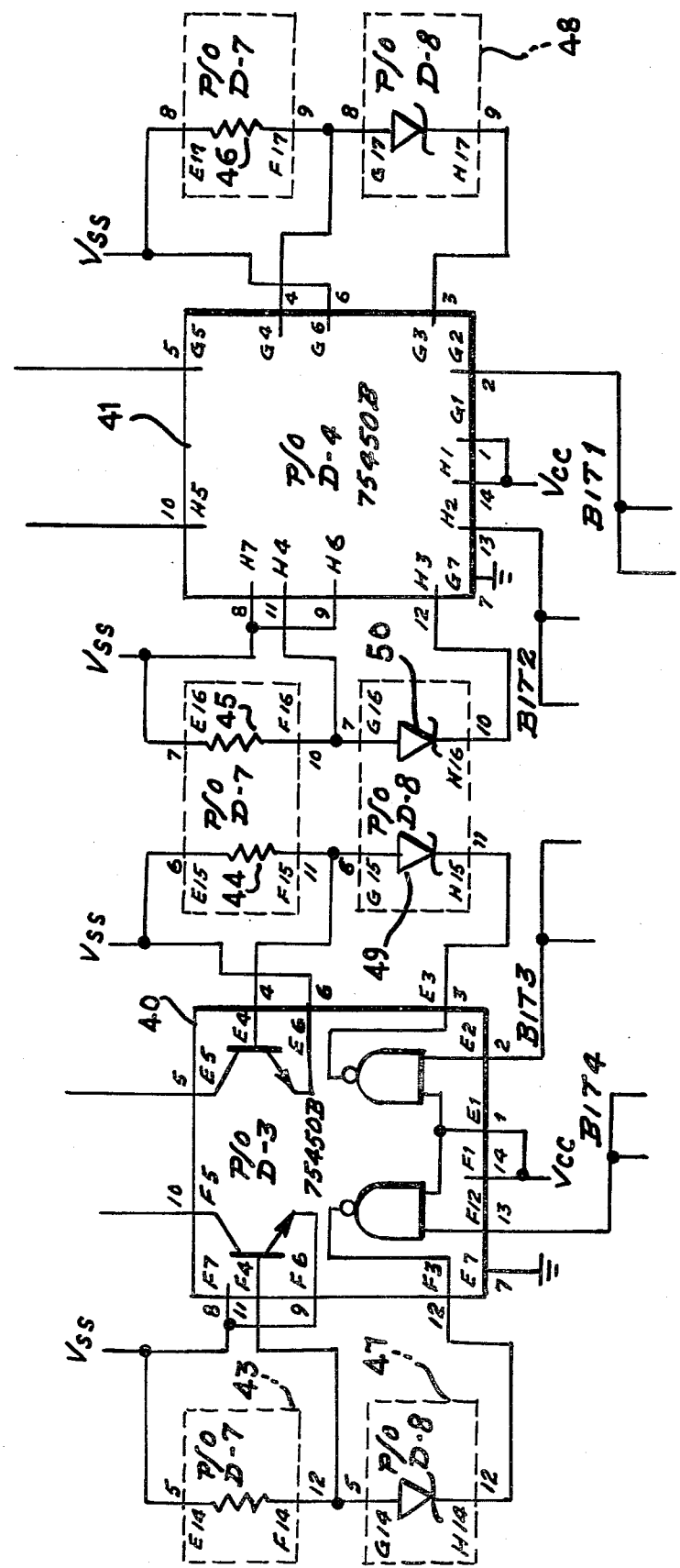
Figure 6C:
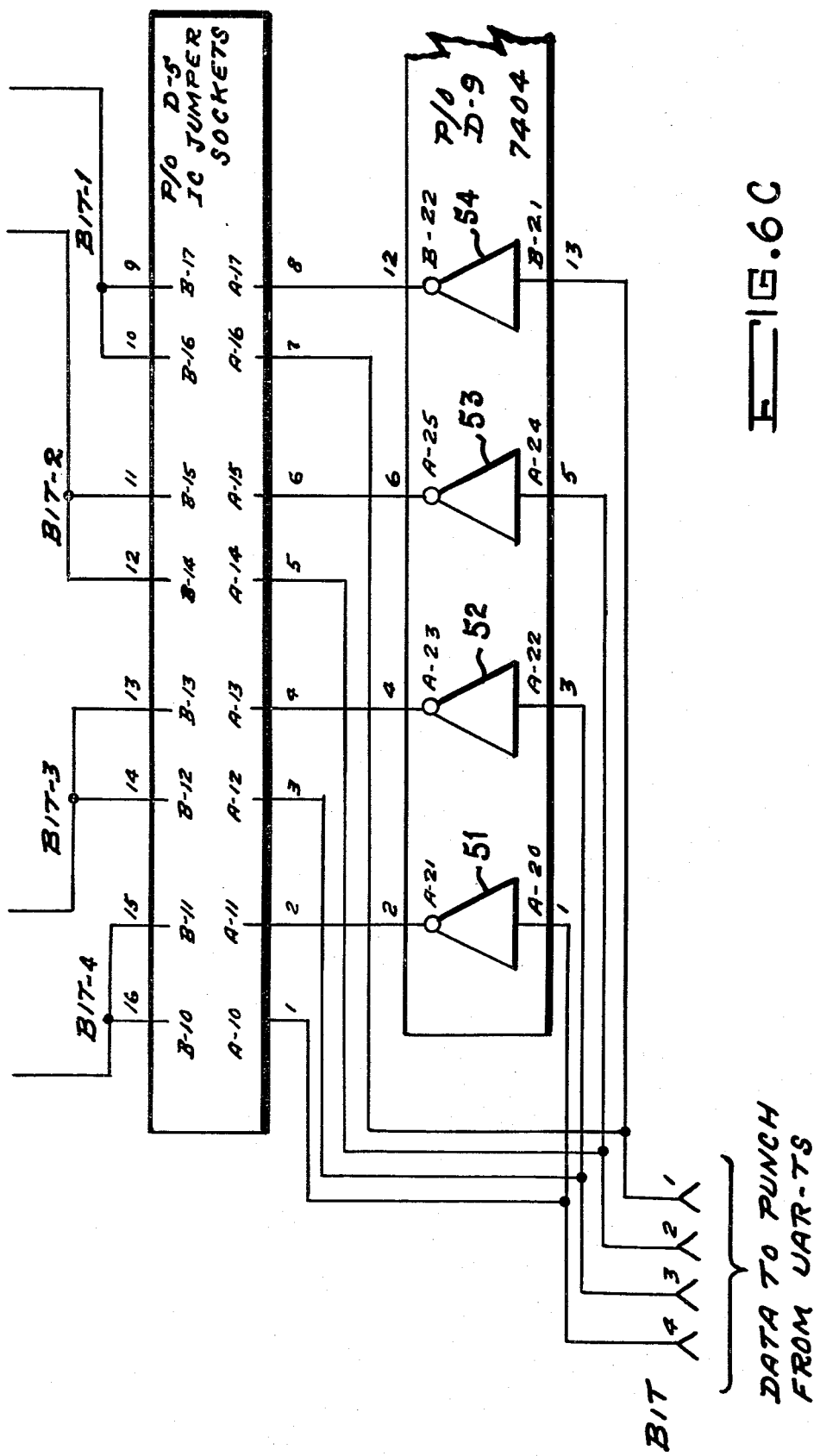

FIGS. 6, 6a, 6b, 6c, 7, 7a, 7b, and 7c show the output level converters between the TTL logic used internally by the I/O converter and the 0 to −12 V logic levels required by the Siemens equipment. These converters are identical to that described for the printer output. As shown, conversion is accomplished by the circuit consisting of IC chips 40, 41, 60, 61, resistors 43-46, 63-66, zener diodes 47-50, 67-70, and inverters 51-54, 71-74. In FIG. 6b the logic for output data bits 1 through 4 is shown. Associated with each bit is an inverter circuit and a patch area which enables selection of logic state polarity to the output device.

Figure 7:
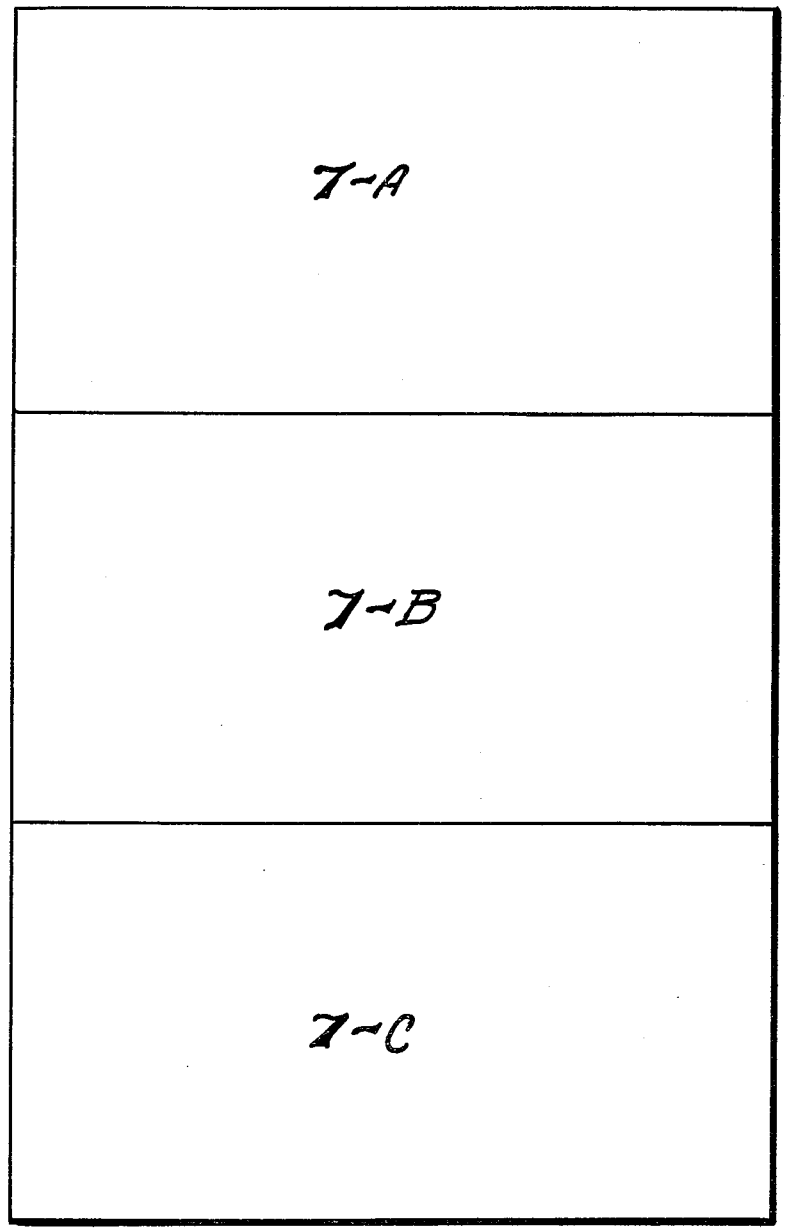
FIG. 7, being comprised of FIGS. 7a, 7b and 7c together comprise a schematic diagram of the high level output converters of the I/O converter of FIG. 2.
Figure 7A:
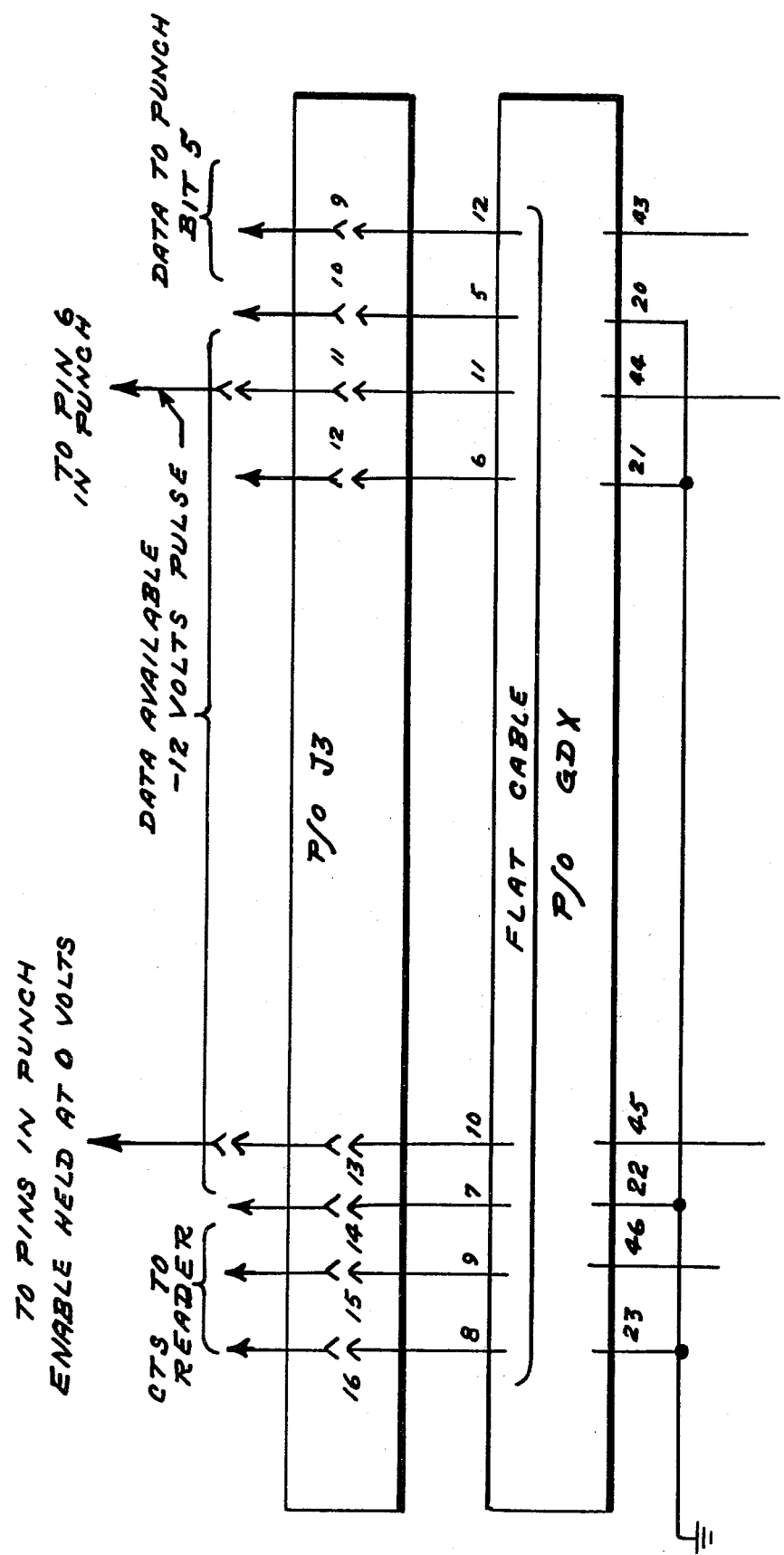
Figure 7B:
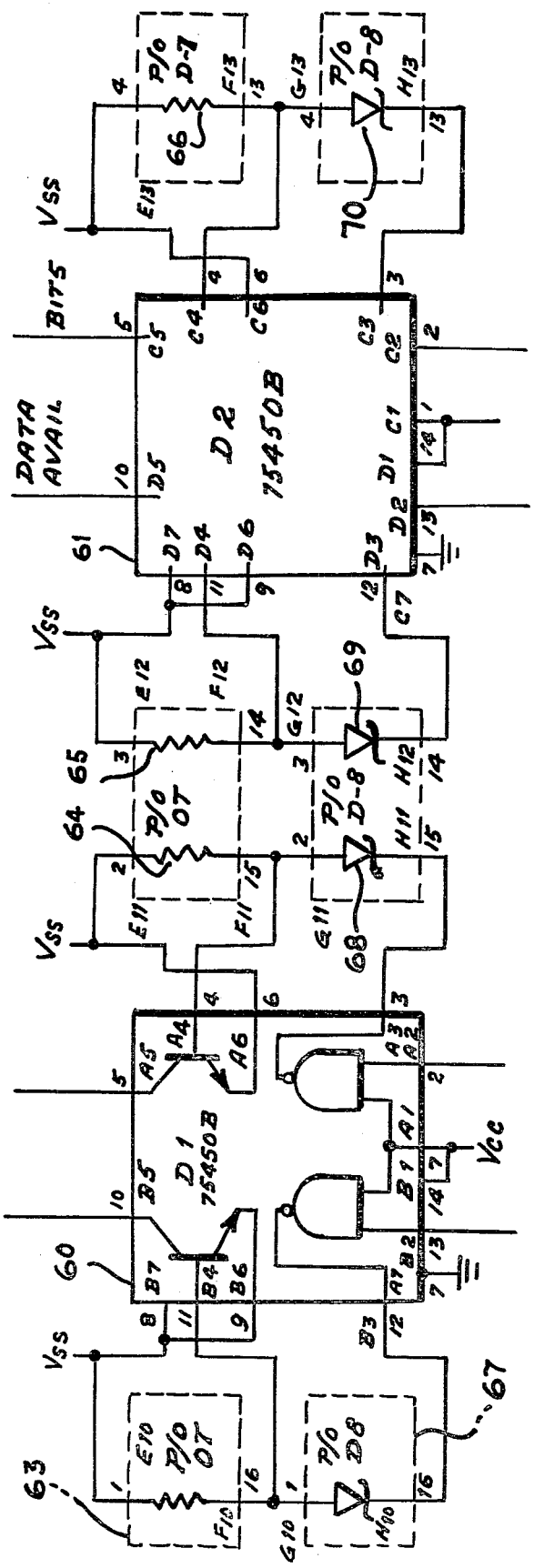
Figure 7C:
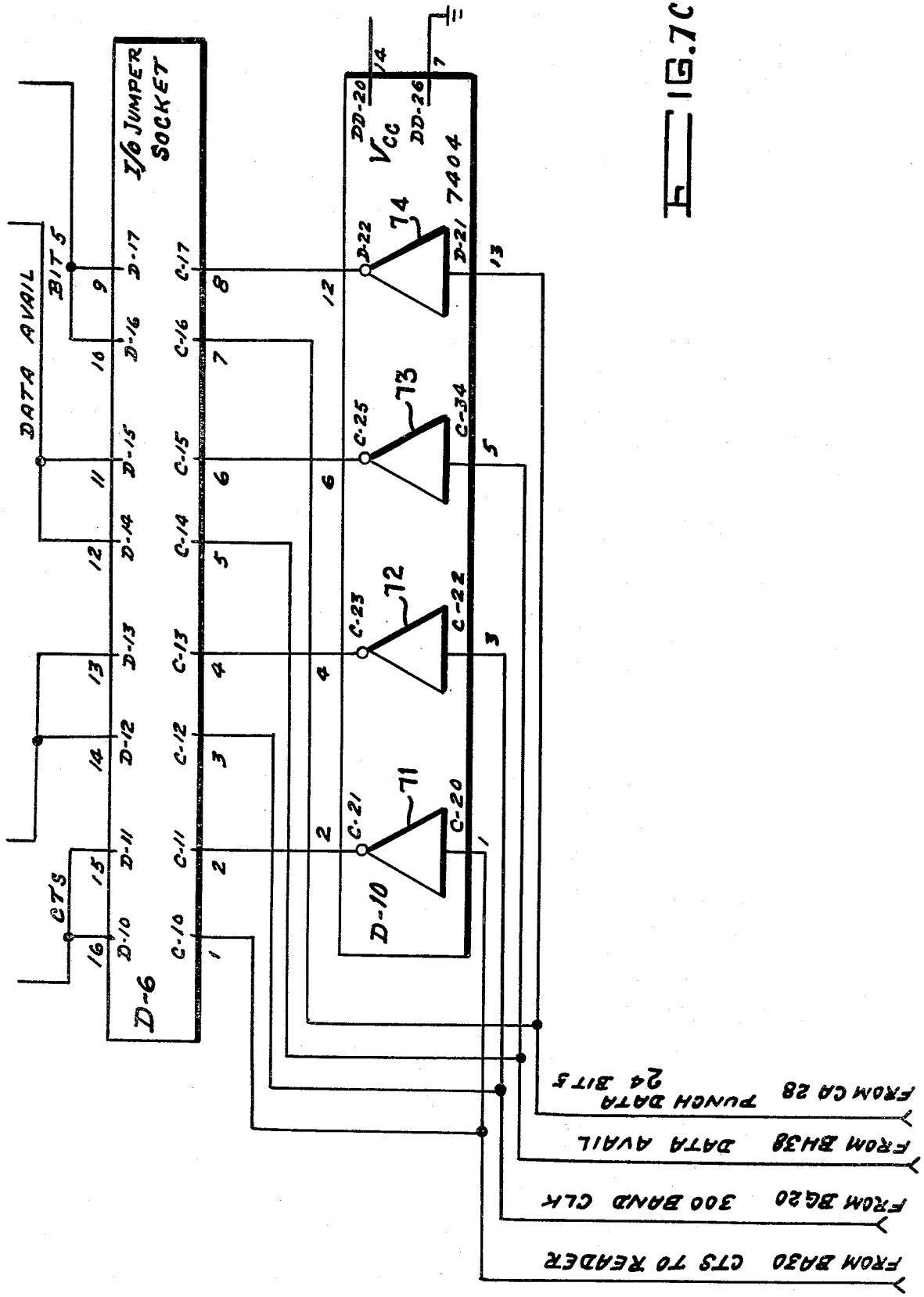

In FIG. 7b three additional outputs to the punch and one output to the paper tape reader are shown. The converter, inverters and patch areas are all identical to those previously described. Two of the three outputs to the punch, Data Available and Bit 5, have been discussed above. The third output from ICD1, pin A5, is an Enable level which is a driven zero volts to the punch units. Initially, this signal requirement was defined as a 300 baud clock which is still present at patch area D6 on pins DD12 and DD13. For this application there is no jumper required in either of these two positions. The reader signal will be discussed later.

Figure 8A:
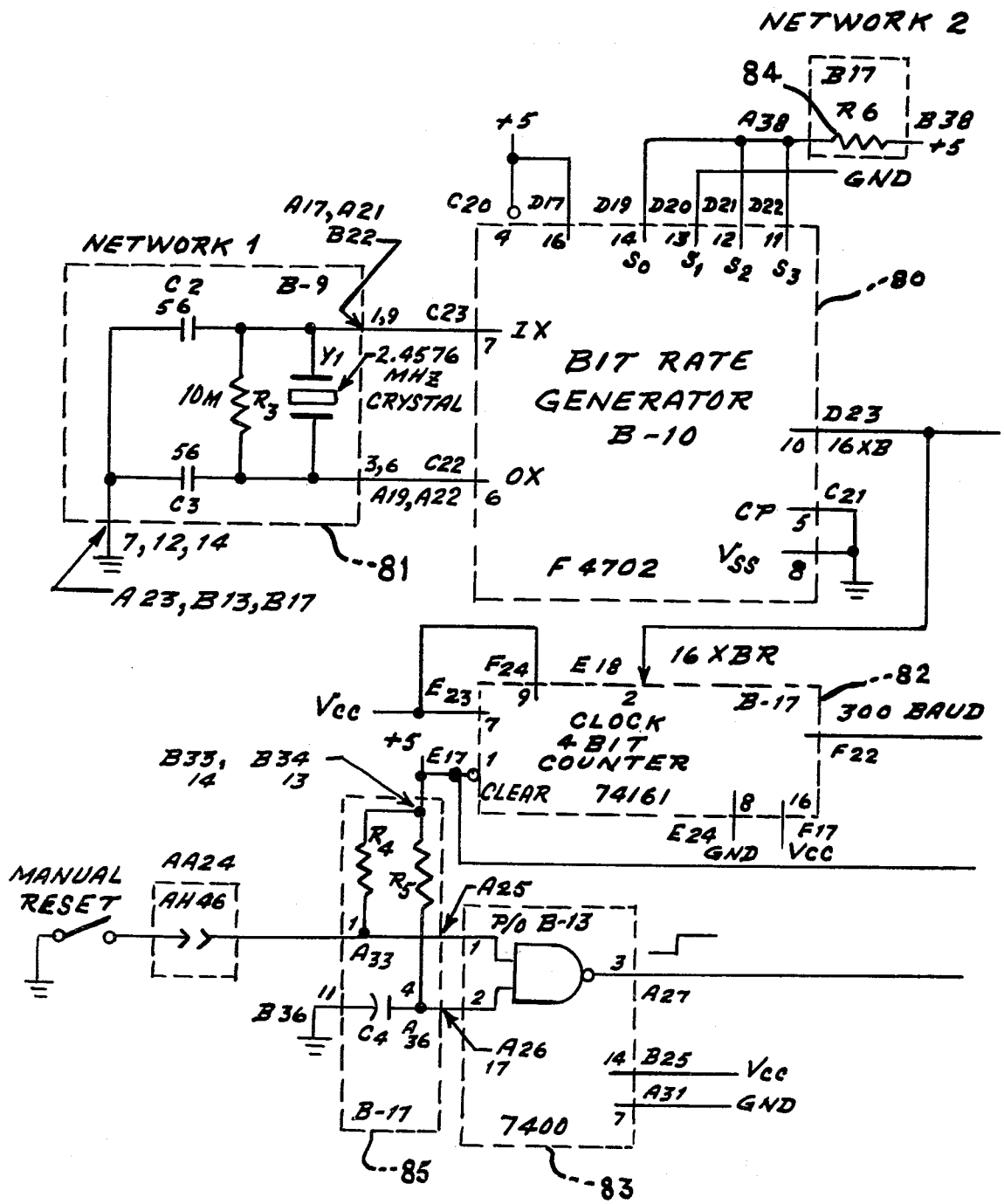
FIG. 8, being comprised of FIGS. 8a and 8b is a schematic diagram of the 300 baud clock and power reset of the I/O converter of FIG. 2.
Figure 9:
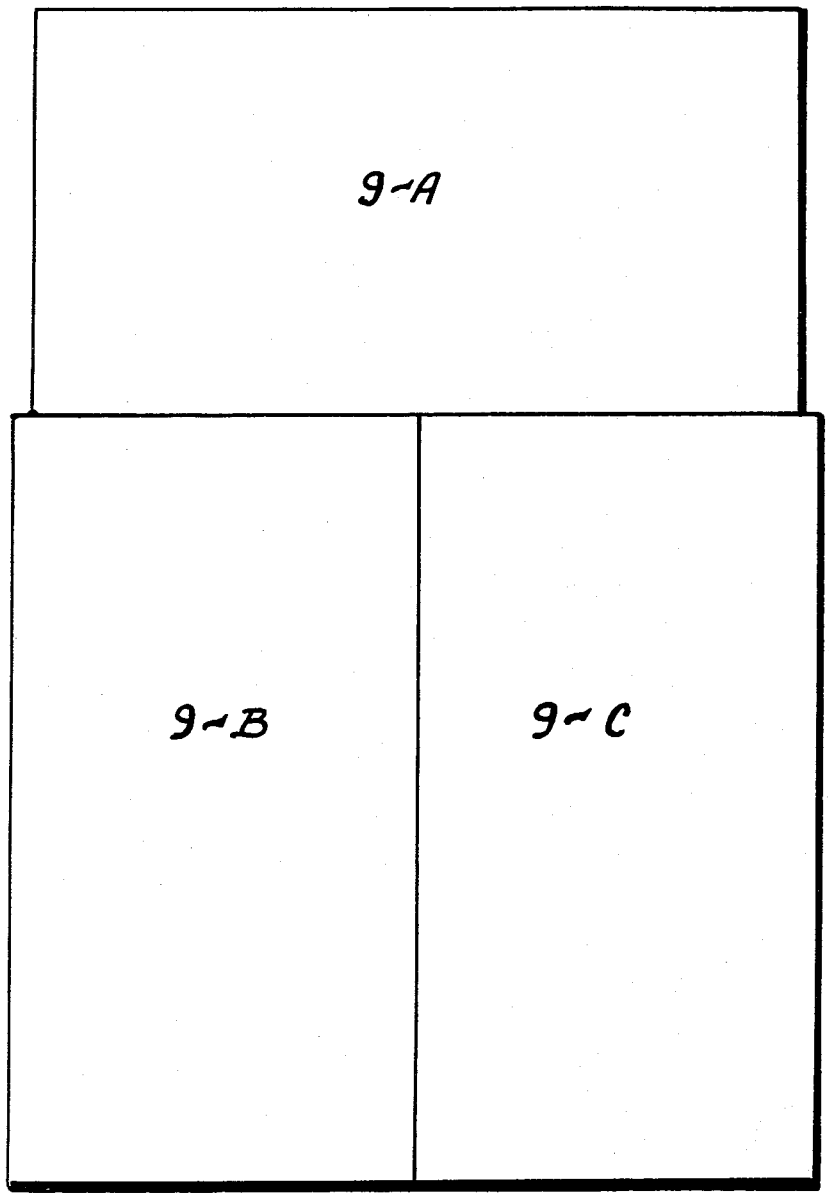
FIG. 9, being comprised of FIGS. 9a, 9b and 9c is a schematic diagram of the high level to TTL input converter of the I/O converter of FIG. 2.
Figure 9A:
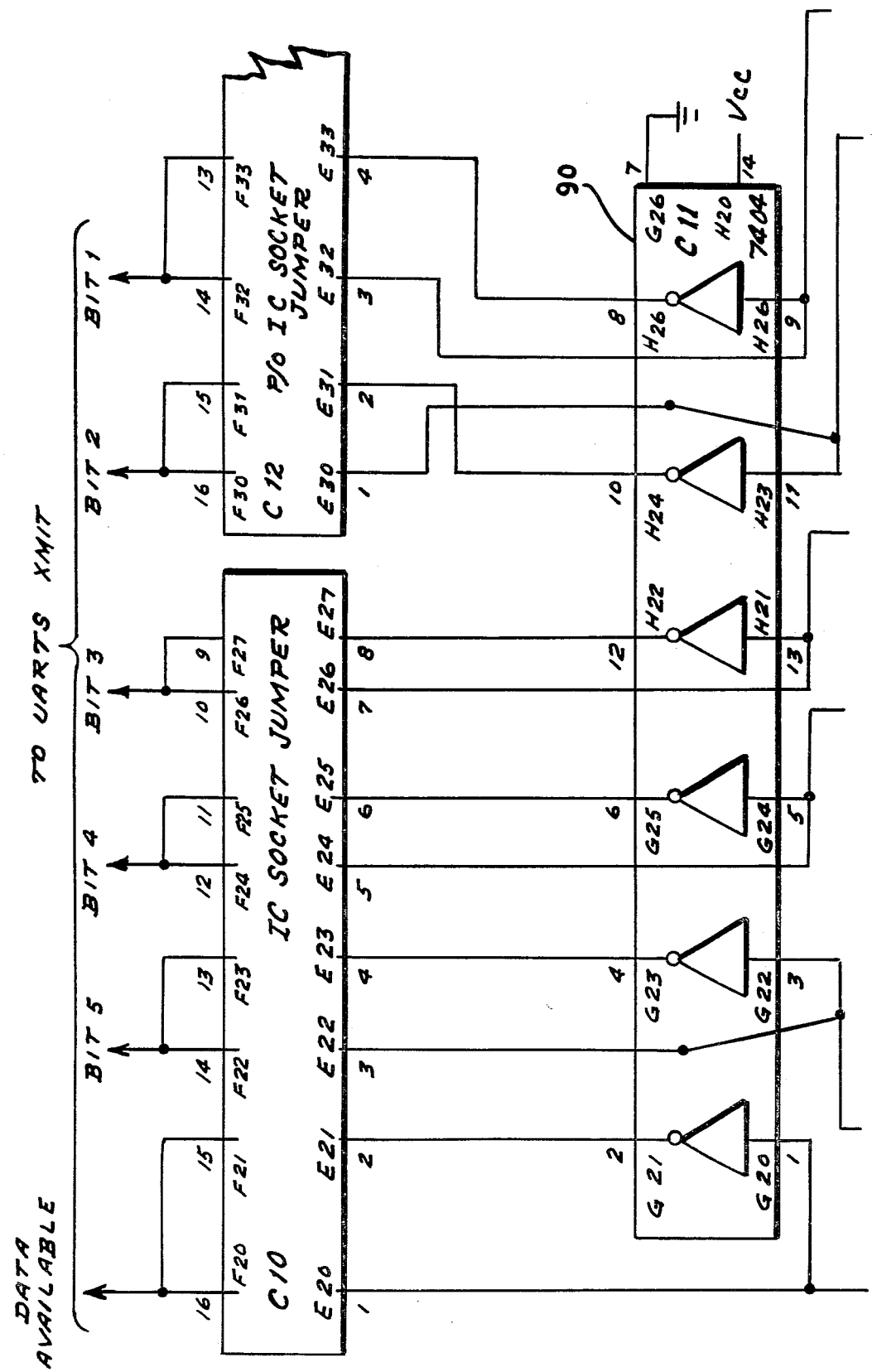
Figure 9B:
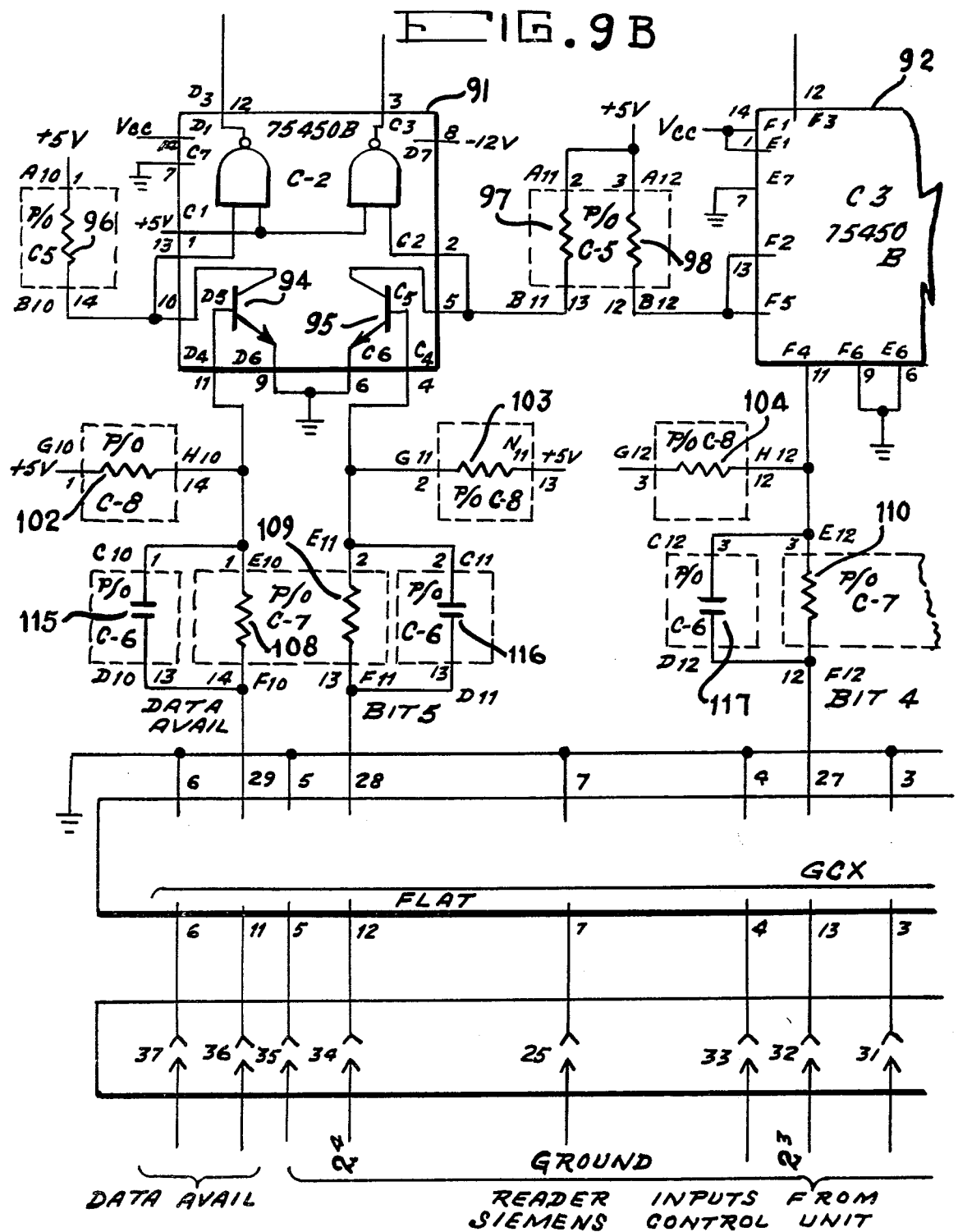
Figure 9C:
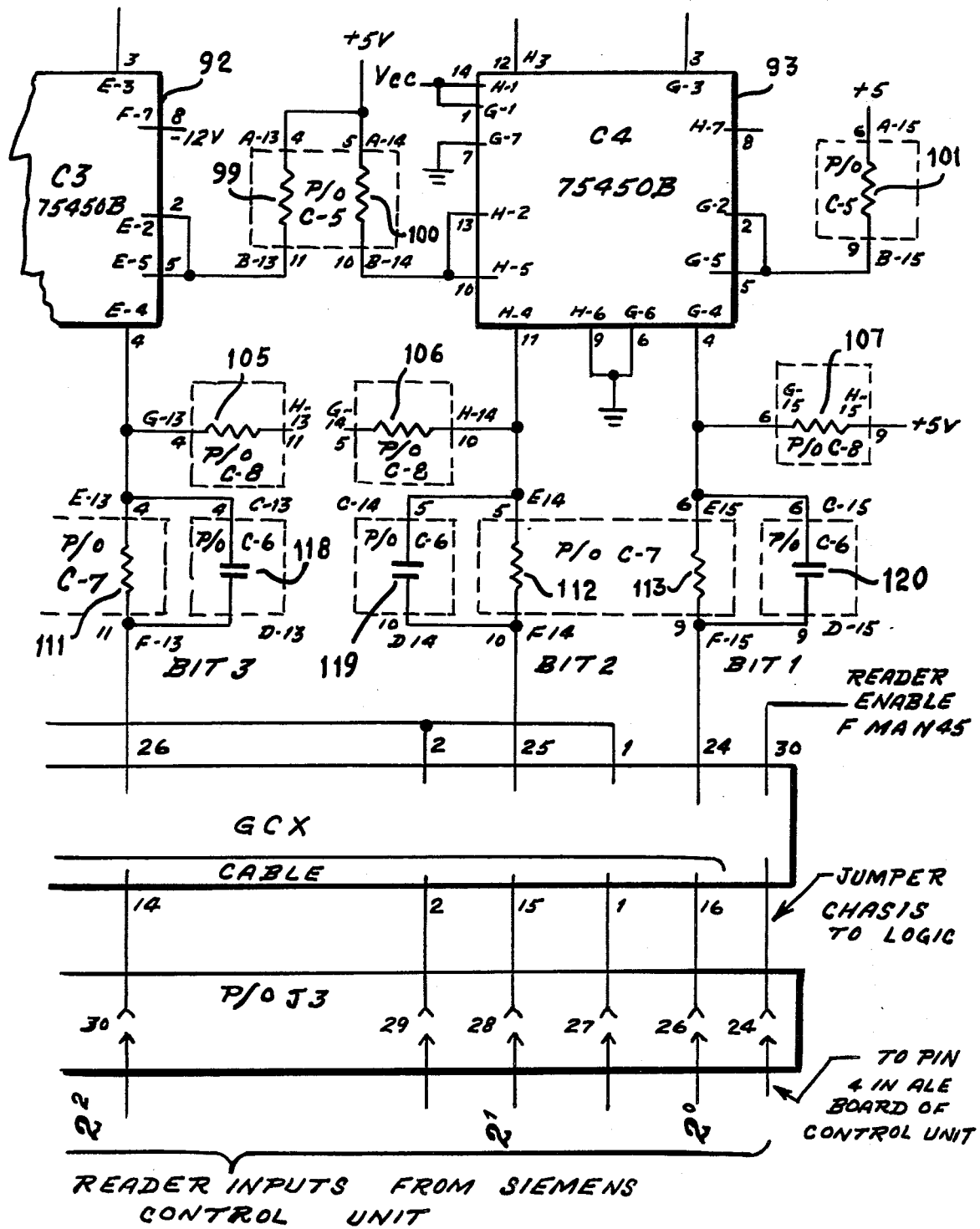

The logic for the internal clock generation and reset circuitry is shown by the schematic diagram of FIGS. 8, 8a and 8b. The circuit illustrated thereby comprises bit rate generator 80, crystal controlled oscillator source 81, counter 82, NAND gate 83, resistor 84, RC network 85, inverters 86, 87 and strapping means 88.

Basic square wave timing at 16 times baud rate (4.8 KHz) is generated by a special integrated circuit Bit Rate Generator 80 (Fairchild P4702). It is capable of generating a multitude of standard data transmission clock rates. The particular output frequency is dependent upon the strapping of input pins S0, S1, S2 and S3. Presently, it is strapped for 4.8 KHz which is 16 times the 300 baud receive and transmit rate. The chip requires a crystal controlled oscillator source. The 16 times baud rate clock is passed through inverter 86 and strapping area 88 to a second inverter 87. The strapping area permits selections of clock polarity. The second inverter is used as a buffer and driver.

The 16×BR clock also is presented to the input of a 4 bit counter which divides by 16. The output of the divider logic is a 300 baud clock which appears at BF22. The 300 baud clock also passes through a patching area and driver as shown before distribution. During loopback operation, this signal is substituted for the normal CTS signal from the MAID.

Generation of a reset pulse takes place at power-on through the RC network R5, C4 on network 85 or when the Manual Reset is depressed.

FIG. 9, 9a, 9b and 9c schematically illustrate the high level to TTL into converter circuit. This circuit comprises inverter 90, integrated circuits 91, 92, 93, transistors 94, 95, resistors 96–113, and comparators 115–120. Information from the paper tape reader enters the I/O Converter through the high level to TTL input converters. The logic levels from the reader are at 0 volts for a logic zero and −12 V for a logic one. These levels must be converted to standard 0 to +5 V levels by use by the UAR-T transmitter. The conversion is handled by the same type of integrated circuit used for the output conversion, a 75450B. However, in this case, the discrete component, the transistor, is switched between saturation and cutoff by the 0 and −12 V signal. This switches the output at the collector between ground and +5 V through the associated pull up resistor. The resulting level is inverted by the internal one-legged AND gate and passed on to an inverter and patching area. The patching area permits selection of input data polarity to the transmit UAR-T.

Accompanying the data from the reader is a Date Available signal which will be used to gate data at the UAR-T transmitter.

Figure 10:
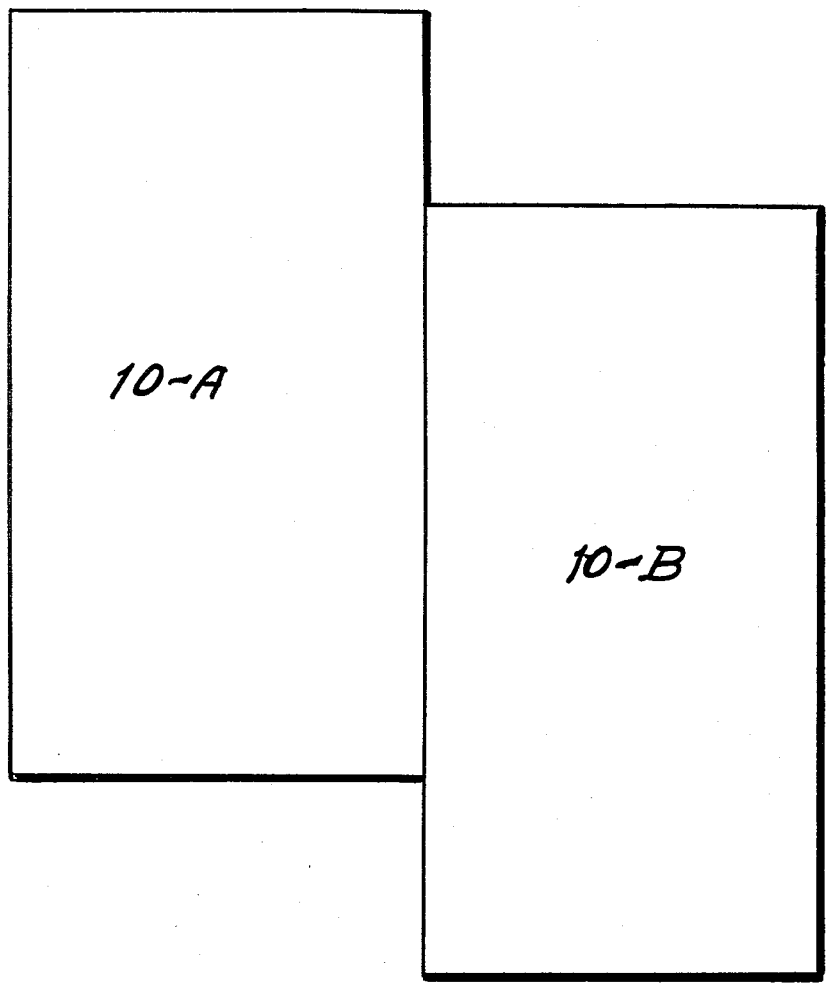
FIG. 10, being comprised of FIGS. 10a and 10b, is a schematic diagram of the UAR-T transmitter function of the I/O converter of FIG. 2.
Figure 10:
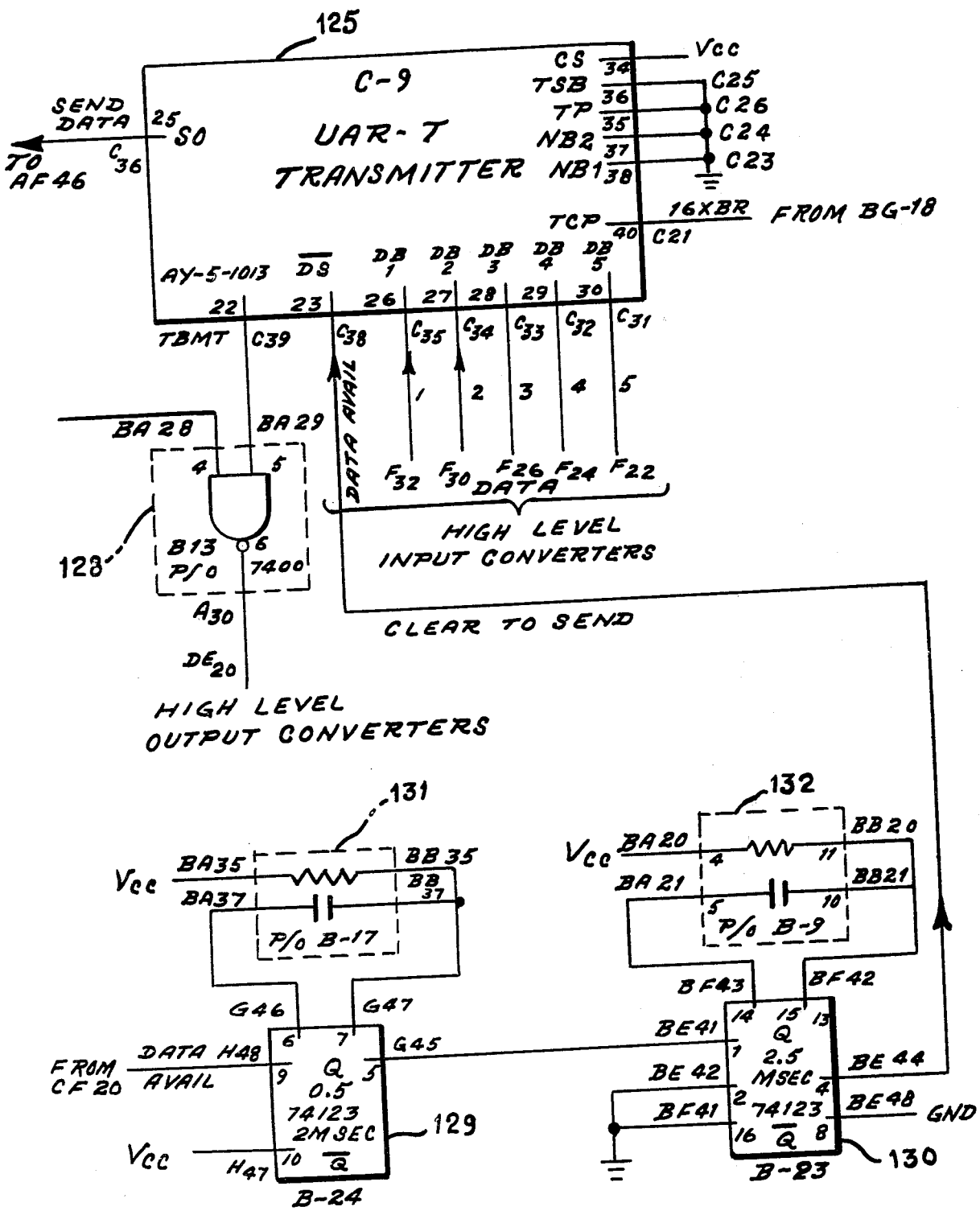

The UAR-T transmitter section of the I/O Converter is shown by FIGS. 10, 10a and 10b. This circuit is responsible for converting the five bit parallel character from the paper tape reader into a seven bit, TTY formatted character which is output serially to the MAID at 300 baud. The circuit comprises P channel nitride process circuit 125, flip flop 126, RC network 127, NAND gate 128, one shot multi vibrators 129, 130 and RC networks, 131, 132. Upon power turn on the UAR-T is cleared by a signal applied to input pin 21. (This is shown on the receiver section logic, FIG. 4) The clearing action results in the generation of signal TBMT (Transmit Buffer Empty) on output pin 22. This becomes one input to the AND gate of B13. The other input is generated by the one-shot multibrator 129 at B24 in the presence of a 300 Hz Clear to Send (CTS) signalling from the MAID. As long as the CTS signal is present, the one-shot will continue to produce a 3 microsecond pulse corresponding to each 300 baud period. This 3 microsecond pulse ANDed with the TBMT level produces a gated Clear to Send signal which is converted to high level logic and sent to the paper tape reader. The gated Clear to Send signal, together with a ground level supplied by the Reader Enable Switch on the front panel, conditions the tape reader. As soon as a tape is placed in the read station it is then advanced to a character position. This results in the five data bit levels and a Data Avaliable signal being output from the reader to the I/O Converter where they are converted to TTL levels and appear as inputs in FIG. 10.

The five parallel data inputs appear to the UAR-T receiver section on pins CC31–CC35. The data available signal must be delayed and shaped by additional logic. The positive going edge of the Data Available signal at the H48 results in the setting of the one-shot 129 at B24 (lower center). Two microseconds later the one-shot self-resets providing an input to the second one-shot 130 at B23. This one-shot stays set for 2.5 microseconds. The combined effect of the two one-shots is the generation of a 2.5 microsecond pulse which is delayed 2 microseconds from the leading edge of the input data. This delay allows the input lines to completely stabilize before the generated strobe (shaped Data Available intput on UAR-T input pin C38) strobes the data into a receiving register and causes the resetting of the TMET level.

The data strobe also initiates the generation of a Start bit and initiates the serial output of the TTY formation character. The TBNT level remains at a low state during the entire period until the center of the stop bit period (bit seven time). At that time, the TBMT signal returns to a ONE state and if the MAID is still signalling Clear to Send, the reader will forward the next character.

The process of reading and serializing continues until one of three events occurs: (1) the MAID ceases to send a Clear to Send, indicating it can no longer accept additional information because its input buffers are full, (2) the Reader Enable Switch on the front panel is returned to an off position, or (3) there is no additional tape data to be read. Periodic pauses during the outputting process will be observed as the MAID accepts and prepares each message part for transmission.

The output of the transmit section of the UAR-T appears on pin CC36 as a TTY formatted 7 bit character consisting of a Start bit, five data bits and a Stop bit. The TTL waveform is then forwarded to the TTL to BIA output converter on sheet 8.

In the upper right corner of the UAR-T, there are a number of input pins which are either strapped to a ground potential or Vcc. Pin 34 is the control strobe which causes the remaining selected options to be continually gated. Pin 36 (TSB) controls the number of Stop bits. With this pin strapped to a ground potential only one Stop bit is produced. Pin 35 (TP)is transmit parity. With this input tied to ground, the parity bid is eliminated from the transmit and receive data. Pins 37 and 38 define the character size. With both pins grounded, the data bits per character is five.

Figure 11:
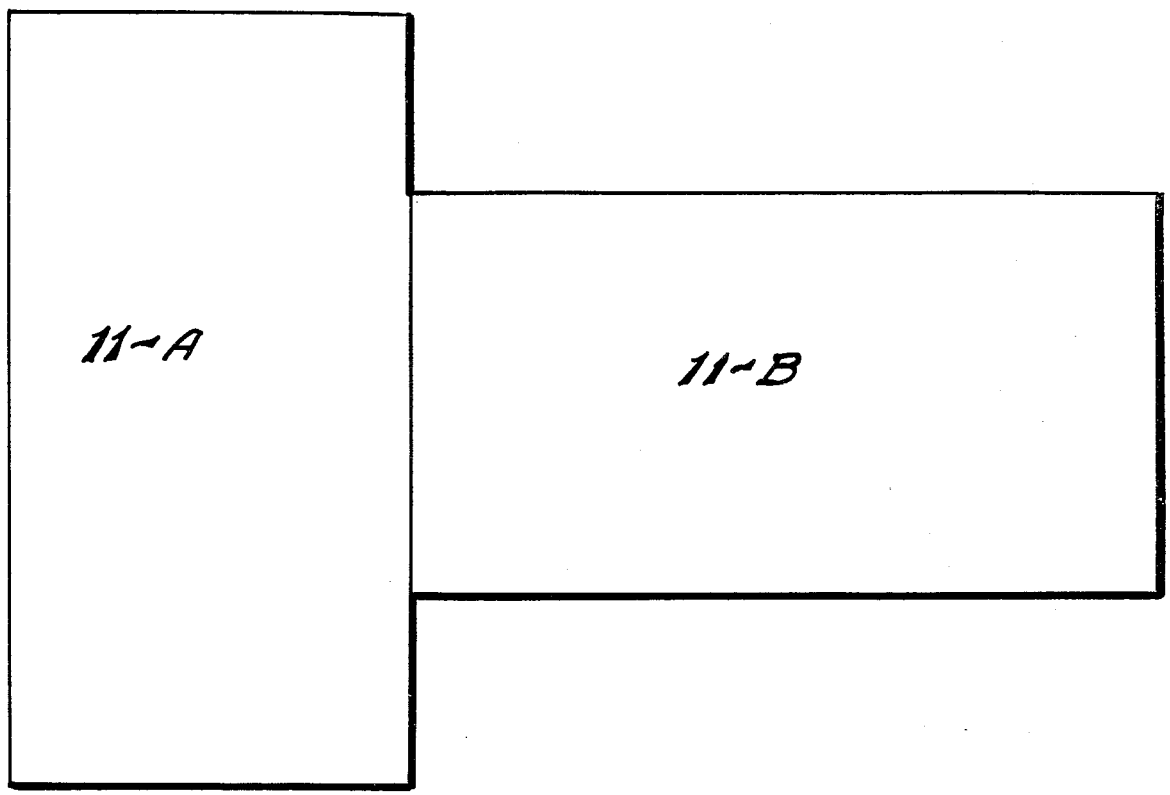
FIG. 11, being comprised of FIGS. 11a and 11b is a schematic diagram of the TTL to EIA output converters of the convertor of FIG. 2.

FIGS. 11, 11a and 11b schematically illustrate the TTL to EIA output converters. This circuit is comprised of integrated circuit 135, strapping means 136 and inverter 137. The logic shown in FIG. 11 is used to allow selection of output signal polarity to the MAID and for converting TTL logic levels to standard EIA + or −6 V levels. The input Send Data signal from the UAR-T is presented in an uninverted and inverted form to the patching area A22 where a strap selection of polarity must be made. This signal is then converted to EIA levels by the 8T15. The 8T15 is very sensitive to input power voltage levels and will not operate with + or −8 V or less. The +5 Vdc voltage is used as a Data Terminal Ready Conditions signal. The inverter and strapping options are made available in the event that a more complex Data Terminal Ready Condition be required. The transmit data is sent to the Loopback switch for the self test provision.

The front panel display and receiving arrangement is shown by FIG. 12. It comprises manual reset 140, reader enable switch 141, diodes 142, 143 and resistor 144.

FIGS. 13, 13a and 13b schematically illustrate the I/O converter power supply. This circuit comprises regulated supply 145, socket 146, line filter 147, switch 148, fuse 149 and by-pass capacitors 150–153.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. In a communication system having an interface terminal operating at a first logic voltage level of +6 V and providing simultaneous asynchronous transmission and reception of serial 7 bit digital data and a digital message transmission and reception terminal with recording means operating at a second logic voltage level of 0 to −12 Vdc with parallel 5 bit digital data, the improvement residing in an input/output converter, said input/output converter comprising:

a programmable processor means having a receiver function and a transmitter function and operating at a third logic voltage level of 0 to 5 Vdc.

a first converter circuit receiving serial 7 bit digital data from said interface terminal at said first logic voltage level and converting said data to said third logic voltage level, a second converter circuit receiving parallel 5 bit digital data from said digital message transmission and reception terminal at said second logic voltage level and converting said data to said third logic voltage level, a third converter circuit receiving serial 7 bit digital data from said programmable processor means at said third logic voltage level, converting said data to said first logic voltage level and transmitting said converted data to said interface terminal, a fourth converter circuit receiving 5 bit parallel data from said programmable processor means at said third logic voltage level, converting said data to said second logic voltage level and transmitting said converted data to said digital message transmission and reception terminal, and system clock operating at a 300 baud rate, said programmable processor means being a universal asynchronous receiver transmitter and implementing its receiver function by receiving serial 7 bit data from said first converter circuit, converting said serial 7 bit data to 5 bit parallel data and transmitting said converted data to said fourth converter circuit, said programmable processor means implementing its transmitter function by receiving parallel 5 bit digital data from said second converter circuit and converting said parallel 5 bit digital data to serial 7 bit digital data, said recording means comprising a printer operating at said second logic voltage level with serial 7 bit data and said input/output converter including a fifth converter circuit, said fifth converter circuit receiving 7 bit digital data at said third logic voltage level from said first converter circuit, converting said data to said second logic voltage level and transmitting said converted data to said printer, and said input/output converter including an error detection circuit responsive to the receiver function of said programmable processor, said error detection circuit indicating the absence of the correct logic voltage level during processing functions.

* * * * *